(12) United States Patent
Le et al.

(10) Patent No.: US 11,898,014 B2
(45) Date of Patent: Feb. 13, 2024

(54) BITUMEN COMPOSITIONS COMPRISING LIGNIN

(71) Applicant: Inbicon A/S, Fredericia (DK)

(72) Inventors: Duy Michael Le, Copenhagen (DK); Mia Frosch Mogensbæk Foverskov, Herlev (DK)

(73) Assignee: Inbicon A/S, Fredericia (DK)

( * ) Notice: Subject to any disclaimer, the term of this patent is extended or adjusted under 35 U.S.C. 154(b) by 1479 days.

(21) Appl. No.: 15/778,029

(22) PCT Filed: Nov. 24, 2016

(86) PCT No.: PCT/DK2016/050395
§ 371 (c)(1),
(2) Date: May 22, 2018

(87) PCT Pub. No.: WO2017/088892
PCT Pub. Date: Jun. 1, 2017

(65) Prior Publication Data
US 2018/0346658 A1 Dec. 6, 2018

(30) Foreign Application Priority Data

Nov. 24, 2015 (EP) ..................................... 15196122

(51) Int. Cl.
| | |
|---|---|
| *C08L 95/00* | (2006.01) |
| *C08H 8/00* | (2010.01) |
| *C08L 97/00* | (2006.01) |
| *C08L 9/00* | (2006.01) |
| *C08L 53/02* | (2006.01) |
| *C08L 9/06* | (2006.01) |
| *C08L 7/02* | (2006.01) |
| *C08L 19/00* | (2006.01) |
| *E01C 5/12* | (2006.01) |
| *E01C 7/35* | (2006.01) |

(52) U.S. Cl.
CPC .................. *C08H 8/00* (2013.01); *C08L 7/02* (2013.01); *C08L 9/00* (2013.01); *C08L 9/06* (2013.01); *C08L 19/003* (2013.01); *C08L 53/02* (2013.01); *C08L 95/00* (2013.01); *C08L 97/005* (2013.01); *E01C 5/12* (2013.01); *E01C 7/353* (2013.01); *C08L 2555/52* (2013.01); *C08L 2555/64* (2013.01); *C08L 2555/82* (2013.01); *C08L 2555/84* (2013.01); *C08L 2555/86* (2013.01); *Y02A 30/30* (2018.01)

(58) Field of Classification Search
None
See application file for complete search history.

(56) References Cited

FOREIGN PATENT DOCUMENTS

| | | | | |
|---|---|---|---|---|
| CN | 101268121 A | 9/2008 | | |
| CN | 104540956 A | 4/2015 | | |
| EP | 2 918 640 A1 | 9/2015 | | |
| WO | WO 2014/019589 A1 | 2/2014 | | |
| WO | WO-2014178911 A1 | * 11/2014 | ......... | C08B 37/0003 |
| WO | WO 2015/094098 A1 | 6/2015 | | |
| WO | WO 2016/023563 A1 | 2/2016 | | |
| WO | WO 2017/088892 A1 | 6/2017 | | |

OTHER PUBLICATIONS

Xie Yao, Lu Qui-Feng, Jin Yan-Qiao, Cheng Xian-Su "Enzymatic Hydrolysis Lignin Epoxy Resin Modified Asphalt" Advanced Materials Research ISSN: 1662-8985, vols. 239-242, pp. 3346-3349 doi: 10.4028/www.scientific.net/AMR.239-242.3346. MAy 12, 2011 (Year: 2011).*
Wang, Hao and Derewekci Kristen "Rheological Properties of Asphalt Binder Partially Substituted with Wood Lignin" Airfield and Highway Pavement 2013: Sustainable and Efficient Pavements ASCE 2013 977-986 (Year: 2013).*
Anonymous, "The Bitumen Industry—A Global Perspective—Production, chemistry, use, specification and occupational exposure," second edition, Information Series No. 230 (IS-230), asphalt institute and eurobitume, 2011, pp. 1-43.
Pobiner, Harvey, "Improved Inflection Points In The Non-Aqueous Potentiometric Titration Of Acid Functionalites In LigninChemicals By Using Internal Standardization And Ion Exchange," *Analytica Chimica Acta*, 1983, vol. 155, pp. 57-65.
Sluiter, A., et al., "Determination of Structural Carbohydrates and Lignin in Biomass," National Renewable Energy Laboratory, Technical Report NREL/TP-510-42618, 2008, pp. 1-15.
Goldschmid, Otto, "Determination of Phenolic Hydroxyl Content of Lignin Preparations by Ultraviolet Spectrophotometry," *Analytical Chemistry*, 1954, vol. 26(9), pp. 1421-1423.
Gosselink, Dr. Richard, "Lignin valorization towards materials, chemicals and energy," $2^{nd}$ Lund symposium on lignin and hemicellulose valorisation,2015, Lund, pp. 1-21.
McBurney, M., et al., "Cation Exchange Capacity and Buffering Capacity of Neutral-detergent Fibres," *J. Sci. Food Agric.*, 1983, vol. 34(9), pp. 910-916.

(Continued)

*Primary Examiner* — Alexandra M Moore
(74) *Attorney, Agent, or Firm* — Womble Bond Dickinson (US) LLP

(57) ABSTRACT

The current invention concerns composition comprising bitumen, one or more plasticity modifying agent(s), and lignin, as well as methods and uses related to such compositions. In particular, compositions are disclosed with improved properties, such as mixing properties.

38 Claims, 2 Drawing Sheets

(56) References Cited

OTHER PUBLICATIONS

Sundstrom, D., et al., "Use of Byproduct Lignins as Extenders in Asphalt," *Ind. Eng. Chem. Prod. Res. Dev.*, 1983, vol. 22(3), pp. 496-500.
Bourzac, Katherine, "Inner Workings: Paving with plants," PNAS, 2015, vol. 112(38), pp. 11743-11744.
The Iowa Highway Research Board, "The Utilization of Agriculturally Derived Lignin as an Antioxidant in Asphalt Binder," Iowa State University, Center for Transportation Research and Education, 2008, pp. 1-86.

* cited by examiner

BITUMEN COMPOSITIONS COMPRISING LIGNIN

CROSS-REFERENCE TO RELATED APPLICATIONS

This application is a national stage filing under 35 U.S.C. 371 of PCT/DK2016/050395 filed Nov. 24, 2016, which International Application was published by the International Bureau in English on Jun. 1, 2017, and claims priority from European Application No. 15196122.4, filed Nov. 24, 2015, which applications are hereby incorporated by reference in their entirety in this application.

FIELD OF THE INVENTION

The invention relates to bitumen compositions suitable for construction work, such as compositions suitable for roads, pavements, waterproofing, asphalt roofing, adhesive, and the like. The invention also concerns method of providing such compositions and various uses thereof. In particular, this invention concerns polymer modified bitumen (PMB) comprising lignin and one or more further component(s), such as filler(s), aggregate(s), and active component(s).

BACKGROUND OF THE INVENTION

Bitumen is one of the oldest engineering materials and has been used for thousands of years. Ancient inhabitants directly used the natural bitumen, which is usually in the earth's surface. In the early 1900s, refined bitumen was first produced by refining crude oil in the USA. Since then, the world consumption of bitumen has increased rapidly, most of it being used in road construction. In 2011, the world consumption of bitumen was estimated to be approximately 102 million tonnes per year, from which around 85% were used in asphalt for the construction of various kinds of pavements, such as roads and other paved areas. Typically, asphalt will contain approximately 5% by mass of bitumen, with the remaining 95% usually comprising a mixture of mineral aggregates and much finer materials such as limestone filler, as well as further components.

A further 10% of global bitumen production is used in roofing applications, such as asphalt roofing and fiber reinforced membranes in roofing felt, and the remaining 5% is used mainly for sealing and insulating purposes in a variety of building materials, such as water proofing material, pipe coatings, carpet backing, joint sealants, adhesive and paint.

Rolled asphalt, sometimes also called rolled asphalt concrete, is the most widespread use of asphalt/bitumen and is used for making asphalt for road surfaces and accounts according to Wikipedia 19 Nov. 2015) for approximately 85% of the asphalt consumed in the United States. Asphalt pavement mixes are typically composed of 5% asphalt/bitumen cement and 95% aggregates (stone, sand, and gravel). Due to its highly viscous nature, asphalt/bitumen cement must be heated so it can be mixed with the aggregates at the asphalt mixing facility. The temperature required varies depending upon characteristics of the asphalt/bitumen and the aggregates, but warm-mix asphalt technologies allow producers to reduce the temperature required.

When maintenance is performed on asphalt pavements, such as milling to remove a worn or damaged surface, the removed material can be returned to a facility for processing into new pavement mixtures. The asphalt/bitumen in the removed material can be reactivated and put back to use in new pavement mixes. With some 95% of paved roads being constructed of or surfaced with asphalt, a substantial amount of asphalt pavement material is reclaimed each year. According to industry surveys conducted annually by the Federal Highway Administration and the National Asphalt Pavement Association, more than 99% of the asphalt removed each year from road surfaces during widening and resurfacing projects is reused as part of new pavements, roadbeds, shoulders and embankments.

Asphalt paving is also widely used in airports around the world. Due to the sturdiness and ability to be repaired quickly, it is widely used for runways dedicated to aircraft landing and taking off.

Mastic asphalt is a type of asphalt which differs from dense graded asphalt or asphalt concrete in that it has a higher asphalt/bitumen (binder) content, usually around 7-10% of the whole aggregate mix, as opposed to rolled asphalt, which has only around 5% added asphalt/bitumen. This thermoplastic substance is widely used in the building industry for waterproofing flat roofs and tanking underground. Mastic asphalt is heated to a temperature of e.g 210° C. and is spread in layers to form an impervious barrier, e.g. about 20 millimeters thick.

For a general overview about the state of the art concerning bitumen and/or asphalt, including any bitumen comprising compositions, provision of such compositions, as well as uses and applications, standards, definitions and the like, reference is e.g. made to "The Shell Bitumen Handbook, $6^{th}$ edition (SHB #6; ISBN 978-0-7277-5837-8), which is herewith incorporated in its entirety.

The chemistry of bitumen is very complex and the properties of produced bitumen are closely related to the crude oil sources and the refinery processes. By selecting appropriate crude oil and/or proper refinery processes, desired bitumen properties can be obtained. However, there are limits to the properties of bitumen, e.g. resistance to rutting and cracking of road surfaces, abrasion stability, suitability to weather and climatic conditions etc.

In order to obtain bitumen with enhanced quality, an increasing number of investigations also began to focus on bitumen modification. Bituminous materials are typically very poor in workability when used as paving material, adhesive or waterproofing material, owing to their extremely high adhesiveness. Therefore, bituminous materials are often used after their flowabilities are enhanced by a means such as heating (i.e., heat melting process), treatment to be in the form of emulsion by using a proper emulsifying agent and water, and dissolution in a suitable solvent, for securing a desirable workability. Among such emulsions of bituminous materials, aqueous emulsions of asphalt are generally called "asphalt emulsions". Such asphalt emulsions can e.g. be classified into fast-decomposing emulsions (emulsions for application) which are directly applied to the object surface, and slow-decomposing ones (i.e., emulsions for blending) which are blended with aggregate. Although the surfactant to be used in the preparation of an asphalt emulsion is suitably selected from among anionic surfactants, cationic surfactants, nonionic surfactants and amphoteric surfactants, the kind thereof is generally determined depending upon the process of execution thereof.

Among the above asphalt emulsions, one for blending is mixed with aggregate, filler and other components. The asphalt composition thus prepared can be used for the construction of paving of a road. The so-called emulsion breaking is caused by the evaporation and elimination of aqueous components in the composition, after the execution of a road by using an asphalt composition. Thus, the asphalt is hardened to complete the construction of paving of a road.

As earlier described, bitumen can also be used in asphalt roofing. The temperature interval from when the straight (run) bitumen is fluidic to when it is hard and crisp is rather small, which can be problematic, since it should be able to avoid damage despite harsh and changing weather. The temperature interval can be increased (especially towards higher temperatures) by oxidation of bitumen. This can be done by blowing hot air through the bitumen at a temperature about 250° C. To achieve a larger temperature interval towards lower temperatures, a suitably soft bitumen can be chosen to start with, or soft bitumen or bitumen oil can be added after the oxidation.

Most asphalt roofings has bitumen layers with a certain amount of added mineral filler. The addition improves the quality of the asphalt roofing and provides e.g. an arming effect, since the softening point is increased and/or decreasing the risk of cracking. The mineral filler can stabilize the bitumen, since it binds part of the bitumen oils, which could otherwise evaporate and make the bitumen harder. Furthermore, the filler can decrease the effect from UV-light, thus the bitumen decomposes at a lower rate. The addition of filler may also decrease the flammability of bitumen, and thus increase the asphalt roofing's resistance towards fly fire.

Polymer modified bitumen (PMB), i.e. bitumen comprising elastomers, plastomers, rubber, recycled tire rubbers, viscosity modifiers and/or reactive polymers have become increasingly popular as a replacement for penetration grade bitumens, e.g. in the upper layers of asphalt pavements, but also in other industrial applications, due to their improved properties. It has been shown that the softening point of PMBs can be influenced by the type and amount of polymer added to the bitumen. While styrene-butadiene copolymers were the most widely used bitumen modifiers in the first decade of the twenty-first century, in recent years other modifiers have become increasingly popular in the quest to enhance bitumen performance. Examples include paraffin, amide waxes and recycled crumb rubber.

Bitumen does not have an exact melting point; it gradually gets softer when exposed to heating. The softening point of bitumen can be determined by use of a method specified in the European standard, EN 1427. In the above-mentioned method, a ring with a diameter of 20 mm is filled with bitumen and after cooling, it is placed in a liquid bath. On top of the bitumen filled ring, a ball of steel with a mass of 3.50 g is placed, and the liquid bath is gradually heated by 5° C. per minute. The ball will eventually sink through the bitumen layer in the ring, and when the ball reaches a given depth, the temperature is measured and defined as the softening point of the bitumen.

The indication of the viscosity/softness at a given temperature can be determined by using the method described in the European standard, EN 1426, wherein, in essence, it is determined how far a standard needle penetrates into the bitumen, when a load of 100 g is applied for 5 sec.

There is a variety of specifications concerning bitumen, and bitumen comprising compositions. These comprise e.g. EN 12591, EN 13924, EN 14023, IS 73:2006, ASTM D946-09, ASTM D3381-09 and M 226-80.

Further standards/and or specifications related to bitumen and/or bitumen-comprising compositions can e.g. be found in SHB #6, Chapter 5.

In Europe, bitumens and polymer modified bitumens for asphalts are commonly manufactured to the following standards: EN 12591:2009a (BSI, 2009a), covering penetration and viscosity grade bitumens; EN 13924:2006 (BSI, 2006), covering hard paving grade bitumens, and EN 14023:2010 (BSI, 2010a), covering polymer modified bitumens (PMBs).

Often, bitumens for industrial uses can be specified by EN 13304:2009 (BSI, 2009b), covering oxidised bitumens, and EN 13305:2009 (BSI, 2009c), covering hard industrial bitumens.

Cut-back and fluxed bitumens are bitumens blended with more or less volatile hydrocarbon components (fuels), mainly kerosene. They are e.g. characterised by a viscosity specification, EN 15322:201 3 (BSI, 201 3) providing the framework for such products.

For penetration grade bitumen, simple test methods such as those described in EN 12591 are considered appropriate. Modified bitumen, such as PMB, may require more sophisticated test methods to describe their performance adequately. Although PMBs often comprise advanced technology binders, they are still designated both by the penetration range and a minimum softening point: for example, 45/80-55 is a PMB with a penetration of 45-80 dmm and a softening point of at least 55° C. Apart from the test methods that apply to these traditional methods of nomenclature, the specification framework EN 14023:2010 (BSI, 2010a) includes in its Annex B several more sophisticated tests as key performance parameters that need to be validated, such as (i) bending beam rheometer based on test method EN 14771:2012 (BSI, 2012a), (ii) dynamic shear rheometer based on test method EN 14770:2012 (BSI, 2012b), (iii) deformation energy by force ductility based on test methods EN 13589:2008 (BSI, 2008) and EN 13703:2003 (BSI, 2003), (iv) tensile properties by the tensile test EN 13587: 2010 (BSI, 2010b), and (v) elastic properties by the elastic recovery test EN 13398:2010 (BSI, 2010c).

Oxidised bitumens are often used for industrial applications such as roofing, flooring, mastics, pipe coatings, paints, etc.). They are usually specified and designated by reference to both the softening point and penetration tests: for example, 85/40 is an oxidised grade bitumen with a softening point of 85±5° C. and a penetration of 40±5 dmm. Oxidised bitumens also have to comply with solubility, loss on heating and flash point criteria, such as BSI, 2009b. The softening points of oxidised grades of bitumen are considerably higher than those of the corresponding penetration grade bitumens, and therefore the temperature susceptibility (i.e. the penetration index is high) is much lower, from +2 to +8.

Hard bitumens are used for industrial applications (coal briquetting, paints, etc.). They are specified by reference to both the softening point and penetration tests, but are designated by a softening point range only and the prefix H: for example, H80/90 is a hard grade bitumen with a softening point between 80 and 90° C. Usually, hard bitumens also have to comply with solubility, loss on heating and flash point criteria, such as BSI, 2009c.

Bitumen quality, e.g. in the context of bitumen-comprising compositions for road use, may comprise rheology, cohesion, adhesion and durability (see e.g. SHB #6, Chapter 5, in particular 5.5.1-5.5.4)

It has been suggested to include lignin in bitumen-comprising compositions, including asphalt, see e.g. SHB #6, Table 8.1, p 152. Traditionally, lignin is obtained and isolated as a byproduct in the paper manufacturing industry. Accordingly, in the Kraft process, wood chips are cooked in a pressurized digester in a strong alkaline liquid containing sulfide at 130-180° C. Under these conditions, lignin and hemicellulose degrade into fragments that are soluble in the alkaline liquid. The cellulose remains solid and is separated off for further paper making processing, whereas the liquid containing the lignin fragments, denoted black liquor, is evaporated to a dry matter content of approximately 65-80%. This concentrated black liquor comprising lignin fragments is burned in order to recover chemicals, such as sodium hydroxide and inorganic sulfur compounds for reuse in the Kraft process and in order to utilize the heat value of the lignin fragments contained in the black liquor.

Lignin is usually not isolated in the Kraft process, but the lignin comprising fragments are burned in a wet state. However, if the alkaline black liquor is neutralized or acidified with acid, the lignin fragments will precipitate as a solid and may be isolated. A Kraft processing plant may have facilities for isolating the lignin fragments in this way.

Conveniently, the lignin fragments are isolated by solubilizing carbon dioxide, recovered elsewhere in the Kraft process, in the black liquor in order to neutralize/acidify the black liquor resulting in the precipitation of the lignin fragments.

The lignin fragments recovered from the Kraft process have strongly reduced molecular size, and a very high purity compared to the lignin located in the wood chips from which the lignin originates. It is believed that this reduction of molecular size is due to the fact that the pressurized cooking in the alkaline liquid takes place in presence of sulfide (S2-) or bisulfide (HS−) ions, which act as ether bond cleaving reagents, thus cleaving the ether bonds of the lignin and resulting in lignin fragments having strongly reduced sizes. The high purity is due to the fact that Kraft lignin and hemicellulose has been totally solubilized during the cooking process, whereby it has been completely separated from the cellulose fraction, and afterwards only lignin precipitates during acidification.

Another source of a lignin component may be the biomass refining industry. In the second generation (2G) bioethanol producing process, or the biomass refining process for short, a lignocellulosic biomasss comprising cellulose, hemicellulose and lignin may be converted to ethanol. The process commonly involves i) a hydrothermal pretreatment of the lignocellulosic biomass for making the cellulose accessible to catalysts in a subsequent step; followed by ii) a hydrolysis of the cellulose for breaking down the cellulose to soluble carbohydrates and finally iii) a fermentation of the soluble carbohydrates to ethanol. A fiber fraction and a liquid phase are left behind after the hydrolysis has been performed. The liquid phase obtained after the hydrolysis step comprises soluble carbohydrates useful for fermentation into ethanol. The remaining fraction obtained after the hydrolysis step comprises a lignin component.

The fiber fraction consist mainly of lignin, cellulose, hemicellulose and ash components. Compared to for example Kraft lignin, the lignin from the 2G bio refining industry is a more complex material, where the physio-chemical properties is only sporadically described. The lignin component may be rinsed, washed, filtered and/or pressed in order to obtain lignin in a more purified state. This will however only remove some of the soluble salts and the carbohydrates with short chain lengths. The rinsed, washed, filtered, dried and/or pressed lignin component obtained this way is usually pressed into pellets and used as a solid fuel.

With respect to lignin and/or lignin rich fractions, including methods of their provision, characterization as well as definitions, reference is also made to international patent application PCT/DK2015/050242 "Lignomulsion", filed on 14 Aug. 2015, which is herewith incorporated in its entirety.

Surprisingly and unexpectedly, the inventors have discovered that the use of a lignin-rich fraction provided from biomass, such as lignin-rich fractions from e.g. $2^{nd}$ generation biofuel production, which has been treated to a less severity and, hence, having a low polarity as measured by either the lignin ion exchange capacity and/or phenolic hydroxyl content of the lignin results (herein also called "2G lignin"), among other desired effects and features, in significant less foaming when mixing with bitumen and a plasticity modifying agent, when compared to e,g, pure lignin, and/or Kraft lignin. Without wanting to be bound by any theory, it is also believed that lignin having an lignin ion exchange capacity of 0.4 mol/kg or less, or 0.3 mol/kg or less and/or having a phenolic content of 0.2 mmol/g or less provides the presently found surprising effects.

Consequently, the provision and various uses of bitumen compositions according to the present invention are surprisingly and unexpectedly believed to result in one or more of the following advantages and/or effects, in particular, but not exclusively, when said bitumen compositions comprise e.g. 2G lignin obtained from lignocellulosic biomass, such as soft lignocellulosic biomass, in particular, but not exclusively, from processes comprising a pretreatment essentially without addition of acid or base:

(i) increased environmental friendliness,
(ii) improved $CO_2$ footprint,
(iii) reduced need for chemicals, such as plasticity modifying agents,
(iv) reduced foaming, thus e.g. no or reduced need for anti-foaming agents,
(v) higher degree lignin or lignin-rich components in the bitumen compositions,
(vi) cost reduction, as lignin is generally less expensive than e.g. SBS or other components that can at least in part be replaced or substituted with less expensive lignin,
(vii) reduction or prevention of oxidation, e.g. during mixing of bitumen in the presence of lignin, and/or of e.g. air and/or oxygen exposed surfaces,
(viii) improved UV resistance due to presence of lignin,
(ix) increased life-expectancy (longevity) of the bitumen compositions, roads, pavements, asphalt roofings, waterproofings, adhesives, or any constructions comprising bitumen composition as disclosed herein,
(x) increased penetration resistance, and/or
(xi) increased softening point, when e.g. compared to similar and/or comparable compositions comprising e.g. pure lignin, organosols lignin, soda lignin, Kraft lignin such as Indulin AT, and/or Kraft-like lignin.

SUMMARY OF THE INVENTION

In a first aspect, the present invention concerns a composition comprising bitumen, one or more plasticity modifying agent(s), lignin, and optionally one or more further component(s); wherein said lignin is obtained by a process for treatment of a lignocellulosic biomass, said process comprising:

a) subjecting lignocellulosic biomass to hydrothermal pretreatment resulting in a hydrothermally pretreated lignocellulosic biomass; followed by b) subjecting at least part of said hydrothermally pretreated lignocellulosic biomass obtained in step (a) to a hydrolysis resulting in a liquid fraction comprising soluble carbohydrates, and a fiber fraction comprising a lignin component, wherein said hydrolysis is an acid catalyzed hydrolysis and/or enzymatic hydrolysis; followed by c) optionally subjecting at least part of the liquid fraction obtained in step (b) to a fermentation in order to ferment at least part of said soluble carbohydrates to a fermentation product, such as ethanol, methane or butanol, thereby obtaining a fermentation broth.

In a second aspect, the present invention relates to a composition comprising bitumen, one or more plasticity modifying agent(s), lignin, and optionally one or more further component(s), wherein said lignin has a Lignin Ion Exchange Capacity (LIEC) of 0.4 mol/kg dry matter (DM) or less.

Suitable further components may comprise e.g. aggregates and/or fillers, and/or one or more active component(s), such as e.g. one or more dispersing agent(s), surfactant(s), hydrotropic agent(s), emulsifier(s), preserving agent(s), antifoaming agent (s), viscosity modifier(s), reactive polymer(s) and any combination thereof.

Such compositions can be suitable for construction work, e.g. in sealing work, road work, paving work, providing a surface layer, providing a sealing layer, providing a road and providing a pavement, providing a top layer of a road, and/or in a wide range of applications relating to e.g. (i) agriculture, (ii) buildings and industrial paving, (iii) hydraulics and erosion control, (iv) industrial, (v) paving, (vi) railways, and (vii) recreation.

In a third aspect, the present invention relates to the use of a composition according to the first, or second aspect in one or more of: sealing work, road work, paving work, providing a surface layer, providing a sealing layer, providing a road and providing a pavement, providing a top layer of a road.

Such uses may comprise applications relating to (i) agriculture, (ii) buildings and industrial paving, (iii) hydraulics and erosion control, (iv) industrial, (v) paving, (vi) railways, and (vii) recreation.

In a fourth aspect, the present invention concerns a sealing layer comprising a composition according to the first, second or third aspect of the invention.

Such a sealing layer may be comprised in e.g. a roof, dam, pool, pond, lake, roof, bridge, tunnel, road, or the like.

In a fifth aspect, the present invention relates to an asphalt composition comprising a composition according to the first, second or third aspect of the invention.

Such asphalt compositions comprise mineral aggregates and/or fillers, and may comprise mastic asphalt or rolled asphalt.

In an sixth aspect, the present invention concerns a process for obtaining a bitumen composition, said process comprising:
a. subjecting said lignocellulosic biomass for hydrothermal pretreatment resulting in a hydrothermally pretreated lignocellulosic biomass; followed by
b. subjecting at least part of said hydrothermally pretreated lignocellulosic biomass obtained in step (a) to a hydrolysis resulting in a liquid fraction comprising soluble carbohydrates, and a fiber fraction comprising a lignin component, wherein said hydrolysis is an acid catalyzed hydrolysis and/or enzymatic hydrolysis; followed by
c. optionally subjecting at least part of the liquid fraction obtained in step (b) to a fermentation in order to ferment at least part of said soluble carbohydrates to a fermentation product, such as ethanol, methane or butanol, thereby obtaining a fermentation broth; followed by
d. optionally isolating at least part of said fermentation product from the fermentation broth obtained in step (c) e.g. by distillation;
e. isolating at least part of the lignin from one or more of: the fiber fraction obtained in step (b); the fermentation broth obtained in step (c); or after isolation of at least a part of the fermentation product in step (d);
f. converting at least part of the lignin component obtained in step (e) to a bitumen composition by admixing said lignin component with bitumen and a plasticity modifying agent(s).

DETAILED DESCRIPTION OF THE INVENTION

Figure 1:
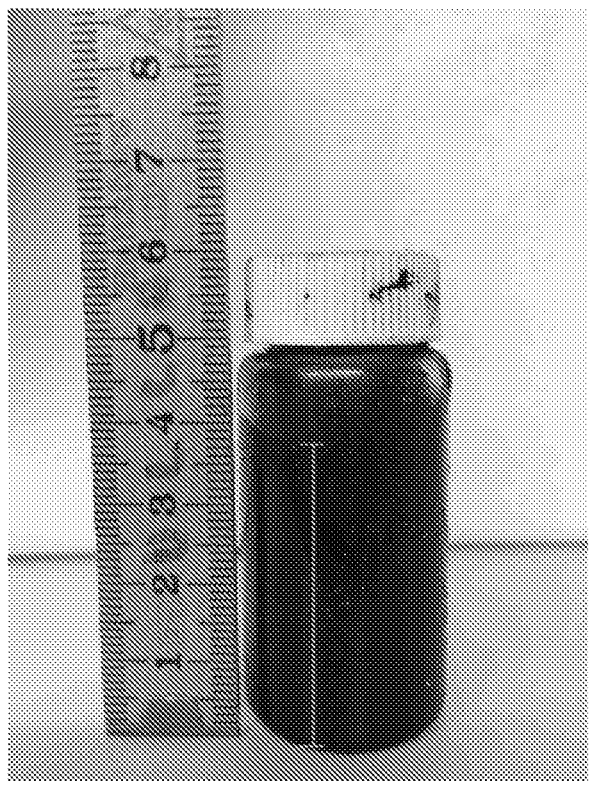
FIG. 1—Measuring relative foam development in a sample.

In the context of the present invention, any term(s) used herein is/are meant to comprise the definitions provided in "The Shell Bitumen Handbook, $6^{th}$ edition nr 6" (ISBN 978-0-7277-5837-8), unless defined otherwise.

In the context of the present invention, the term 'bitumen' is meant to comprise a hydrocarbon product produced from the refining of crude oil. This is commonly achieved by removing the lighter fractions (such as liquid petroleum gas, petrol and diesel) from crude oil during the refining process. In North America, bitumen is commonly known as asphalt binder or asphalt. A comprehensive definition of refined bitumen is used in the industry document The Bitumen Industry—A Global Perspective (Eurobitume and the Asphalt Institute, 2011) and is reproduced here verbatim: Bitumen is an engineering material and is produced to meet a variety of specifications based upon physical properties. Bitumen is the residual product from the distillation of crude oil in petroleum refining. The basic product is sometimes referred to as 'straight run' bitumen and is characterised by CAS #8052-42-4 or 64741-56-6, which also includes residues obtained by further separation in a deasphalting process. Bitumen can be further processed by blowing air through it at elevated temperatures to alter its physical properties for commercial applications. The general characteristics of oxidized bitumen are described by CAS #64742-93-4. The vast majority of petroleum bitumens produced conform to the characteristics of these two materials as described in their corresponding CAS definitions. Bitumen is produced to grade specification either directly by refining or by blending.

The term bitumen is meant to comprise straight run bitumen, hard bitumen, oxidised bitumen, cut-back bitumen and fluxed bitumen.

The term bitumen is sometimes also used for coal-derived products such as coal tar or coal tar pitches. These are manufactured by the high temperature pyrolysis (>800° C.) of bituminous coals and differ from crude oil-derived bitumen substantially in comparison and physical characteristics. However, coal tar and/or coal tar pitches may be comprised in the definition of bitumen in the context of the present invention.

The term bitumen can sometimes also be used for petroleum pitches (CAS #68187-58-6), which are often aromatic residues, produced by thermal cracking, coking or oxidation from selected petroleum fractions. The composition of petroleum pitches differs significantly from crude oil-derived bitumen. However, in the context of the present invention, petroleum pitches may be comprised in the definition of bitumen.

The term bitumen can sometimes also be used for natural or lake asphalt such as Trinidad Lake Asphalt, Gilsonite, rock asphalt and Selenice. These products are unrefined and not produced by refining of crude oil. They often contain a high proportion of mineral matter (up to 37% by weight) and light components, leading to a higher loss of mass when heated. However, in the context of the present invention, natural or lake asphalt such as Trinidad Lake Asphalt, Gilsonite, rock asphalt and Selenice may be comprised in the definition of bitumen.

There is a variety of specifications and/or standards relating to bitumen, and bitumen-comprising compositions. These comprise e.g. EN 12591, EN 13924, EN 14023, IS 73:2006, ASTM D946-09, ASTM D3381-09 and M 226-80, Further examples of bitumen standards/specifications comprise e.g. EN 12591 (including e.g. 20/30, 30/45, 35/50, 40/60, 50/70, 70/100, 100/150, 160/220, 250/330, 330/430) as well as AC Grade Bitumens EN 12591 (including e.g. AC 20, AC 10); Hard Paving Grade Bitumens (EN 13924 (including e.g. 5/15, 10/20, 15/25), Special Paving Bitumens (EN 13924 (including e.g. 1/10 MG, 10/20 MG); Polymer Modified Bitumen, e.g. storage stable, (EN 14023 (including e.g. Q8 Bitumen QmB 25/55-55, 45/80-50, 45/85-65, 75/130-75), Indian oil specifications (IS 73:2006 (VG-10, VG-20, VG-30, VG-40), European Norm specifications ASTM D946-09 (40-50, 60-70, 85-100, 120-150, 200-300), Standard Viscosity Grade Bitumen (ASTM D3381-09 and M 226-80 (AC-2.5, AC-5, AC-10, AC-20, AC-30, AC-40), and RTFOT Viscosity Grade Bitumen (ASTM D3381-09 and M 226-80 (AR-1000, AR-2000, AR-4000, AR-8000, AR-16000)).

In Europe, bitumens and polymer modified bitumens for asphalts are commonly manufactured to the following standards: EN 12591:2009a (BSI, 2009a), covering penetration and viscosity grade bitumens; EN 13924:2006 (BSI, 2006), covering hard paving grade bitumens, and EN 14023:2010 (BSI, 2010a), covering polymer modified bitumens (PMBs).

Often, Bitumens for industrial uses can be specified by EN 13304:2009 (BSI, 2009b), covering oxidised bitumens, and EN 13305:2009 (BSI, 2009c), covering hard industrial bitumens.

For penetration grade bitumen, simple test methods such as those described in EN 12591 are considered appropriate. Modified bitumen (PMB) may require more sophisticated test methods to describe their performance adequately.

In the context of the present invention the term 'Polymer modified bitumen' or 'PMB' is meant to comprise a composition or preparation comprising bitumen and polymer(s), such as plasticity modifying agent(s), and optionally lignin. Thus, PMB may also relate to bitumen comprising one or more plastomer, thermoplastic elastomer, rubber, viscosity modifier, and reactive polymer. Furthermore, PMBs may comprise one or more active components, such as dispersing agent(s), surfactant(s), hydrotropic agent(s), emulsifier(s), preserving agent(s), anti-foaming agent (s), viscosity modifier(s), reactive polymer(s) and any combination thereof.

PMBs have become increasingly popular as a replacement for penetration grade bitumens, commonly in the upper layers of asphalt pavements, often due to the better properties of PMBs. Although they represent advanced technology binders, they are still designated both by the penetration range and a minimum softening point: for example, 45/80-55 is a PMB with a penetration of 45-80 dmm and a softening point of at least 55° C. Apart from the test methods that apply to these traditional methods of nomenclature, the specification framework EN 14023:2010 (BSI, 2010a) includes in its Annex B several more sophisticated tests as key performance parameters that need to be validated, such as (i) bending beam rheometer based on test method EN 14771:2012 (BSI, 2012a), (ii) dynamic shear rheometer based on test method EN 14770:2012 (BSI, 2012b), (iii) deformation energy by force ductility based on test methods EN 13589:2008 (BSI, 2008) and EN 13703:2003 (BSI, 2003), (iv) tensile properties by the tensile test EN 13587:2010 (BSI, 2010b), and (v) elastic properties by the elastic recovery test EN 13398:2010 (BSI, 2010c).

It has been shown that the softening point of PMBs can be influenced by the type and amount of polymer added to the bitumen. While styrene-butadiene copolymers were the most widely used bitumen modifiers in the first decade of the twenty-first century, in recent years other modifiers have become increasingly popular in the quest to enhance bitumen performance. Examples include paraffin, amide waxes and recycled crumb rubber.

In the context of the present invention, the term 'bitumen preparation' is meant to comprise a composition comprising bitumen and one or more further compound, ingredient and the like, such as oil, additive, etc.

In the context of the present invention, the term 'bitumen emulsion' is meant to comprise a preparation or composition comprising droplets of bitumen and one or more other ingredient(s), dispersed in an aqueous medium.

In the context of the present invention, the term 'straight run bitumen' is meant to comprise bitumen produced primarily by distillation processes.

In the context of the present invention, the term 'hard bitumen' is meant to comprise straight run bitumen with low penetration values. Hard bitumens are often used for industrial applications (coal briquetting, paints, etc.). They are specified by reference to both the softening point and penetration tests, but are designated by a softening point range only and the prefix H: for example, H80/90 is a hard grade bitumen with a softening point between 80 and 90° C. Usually, hard bitumens also have to comply with solubility, loss on heating and flash point criteria, such as BSI, 2009c.

In the context of the present invention, the term 'oxidised bitumen' is meant to comprise bitumen produced by passing air through hot bitumen under controlled temperature and pressure conditions, thus producing a product with specific characteristics. Oxidised bitumens are often used for industrial applications such as roofing, flooring, mastics, pipe coatings, paints, etc.). These are usually specified and designated by reference to both the softening point and penetration tests: for example, 85/40 is an oxidised grade bitumen with a softening point of 85±5° C. and a penetration of 40±5 dmm. Oxidised bitumens also have to comply with solubility, loss on heating and flash point criteria, such as BSI, 2009b. The softening points of oxidised grades of bitumen are considerably higher than those of the corresponding penetration grade bitumens, and therefore the temperature susceptibility (i.e. the penetration index is high) is much lower, from +2 to +8.

In the context of the present invention, the term 'cut-back bitumen and/or 'fluxed bitumen' is meant to comprise bitumen blended with more or less volatile hydrocarbon components (fuels), mainly kerosene. Such bitumen(s) is/are e.g. characterised by a viscosity specification, EN 15322:201 3 (BSI, 201 3) providing the frame¬work for such products.

Bitumen quality, e.g. in the context of bitumen-comprising compositions for road use, may comprise rheology, cohesion, adhesion and durability, e.g. as disclosed in SHB #6, Chapter 5, in particular chapters 5.5.1-5.5.4)

In the context of the present invention, the term "asphalt" is meant to comprise material road surfacing material comprising or consisting essentially of bitumen, mineral aggregates/fillers and may comprise further additives. Thus, asphalt relates to compositions comprising bitumen and aggregate(s)/filler(s), optionally further components, said composition(s) usually suitable for road surfacing products and commonly containing primarily bitumen and mineral aggregates. Asphalt as used herein may also comprise alternative terms such as hot mix asphalt (HMA) and asphalt concrete (AC). Asphalt is often referred to incorrectly in the media and in common parlance as tarmac (short for tarmacadam). Tarmacadam is a road surfacing product using coal tar as a binder and has not been used in road construction for over 30 years.

The extremely wide range of uses for bitumen is demonstrated by the number of registered uses in Europe under the requirements of the Registration, Evaluation, Authorisation and Restriction of Chemicals (REACH) regulations, which require all chemical substances and associated uses to be registered.

Bitumen can be used in a variety of areas, such as (i) agriculture, (ii) buildings and industrial paving, (iii) hydraulics and erosion control, (iv) industrial, (v) paving, (vi) railways, and (vii) recreation. Further specific examples of use of the above categories are disclosed elsewhere.

Bitumen is available in a variety of grades. Specifications are used across the world to define these grades to meet the needs of the applications, climate, loading conditions and end use. These are usually based on a series of standard test methods that define the properties of each grade such as hardness, viscosity, solubility and durability.

Bitumens are also used to manufacture mixtures or preparations. In these products, bitumen is often the principal component, but they can contain significant proportions of other materials to meet end use requirements. These mixtures are chemically classified as bitumen preparations.

In the context of the present invention, the terms "aggregate(s)" or "filler(s)" can be used interchangeably, and are meant to comprise the usually the largest constituent in asphalts, typically, but not exclusively e.g. 92-96% by mass. The type of aggregate, its mineralogy, and physical and chemical properties is believed to have a significant impact on asphalt performance. Suitable aggregates, and their properties, for use in conforming to European asphalt mixtures can be specified according to national or regional standards, such as EN 13043 (BSI, 2002). This standard defines aggregate as a 'granular material used in construction', and separates this into one of three types (i) natural, (ii) manufactured, (iii) recycled aggregates, described as follows: (i) Natural aggregate: 'aggregate from mineral sources that has been subjected to nothing more than mechanical processing' (e.g. crushed rock, sands and gravel, often referred to as primary aggregate); (ii) Manufactured aggregate: 'aggregate of mineral origin resulting from an industrial process involving thermal or other modification' (e.g. blast furnace slag); and (iii) Recycled aggregate: 'aggregate resulting from the processing of inorganic or mineral material previously used in construction' (e.g. reclaimed asphalt).

Further categorisation of aggregates can be given by the description for particle size: (i) coarse aggregate: substantially retained on a 2 mm test sieve; (ii) fine aggregate: substantially passing a 2 mm test sieve; (iii) all-in aggregate: a combination of coarse and fine aggregates; and (iv) filler aggregate: substantially passing a 0.063 mm test sieve.

Rock-types suitable as aggregate(s) are meant to comprise (i) igneous, (ii) sedimentary, and/or (iii) metamorphic rock.

In the context of the present invention, the term "plasticity modifying agent(s)" is meant to comprise one or more of plastomer, thermoplastic elastomer, rubber, viscosity modifier, and reactive polymer.

In the context of the present invention, the term "plastomer" is meant to comprise compounds such as ethylene-vinyl acetate (EVA), ethylene-methyl acrylate (EMA), ethylene-butyl acrylate (EBA), atactic polypropylene (APP), polyethylene (PE), polypropylene (PP), polyvinyl chloride (PVC), and polystyrene (PS), including any combination thereof.

In the context of the present invention, the term 'thermoplastic elastomer' is meant to comprise compounds such as styrene-butadiene elastomer (SBE), linear or radial styrene-butadiene-styrene elastomer (SBS), styrene-butadiene rubber (SBR), styrene-isoprene-styrene elastomer (SIS), styrene-ethylene-butadiene-styrene elastomer (SEBS), ethylene-propylene-diene terpolymer (EPDM), isobutene-isoprene random copolymer (IIR), polyisobutene (PIB), polybutadiene (PBD), polyisoprene (PI), including any combination thereof.

In the context of the present invention, the term 'rubber(s)' is meant to comprise crumb rubber, rubber from used tyres, recycled rubber, natural rubber, rubber latex, and the like.

In the context of the present invention, the term 'viscosity modifier(s)' is meant to comprise one or more flux oil (aromatics, napthenics, parrafinics), or Fischer-Tropsch waxes, including any combination thereof.

In the context of the present invention, the term 'reactive polymer(s)' is meant to comprise conpounds such as one or more random terpolymer of ethylene, acrylic ester and glycidyl methacrylate, or maleic anhydride-grafted styrene-butadiene-styrene copolymer, including any combination thereof.

In the context of the present invention, the term "anti-foaming agent(s)" is meant to comprise one or more compounds and/or compositions, often silicone-based, such as active silicone polymers, siloxane polymers, organo-modified siloxanes, but also non-silicone compounds/compositions comprising polypropylene based polyether dispersions, fatty acid-type antifoams, non-ionic emulsifiers. A variety of anti-foaming agent(s) are commercially available and are effective in preventing and/or reducing foaming, and/or decreasing the half-life of foam significantly in bitumen- and/or asphalt-based applications.

In the context of the present invention, the term "active component" is meant to comprise e.g. dispersing agent(s), surfactant(s), hydrotropic agent(s), emulsifier(s), preserving agent(s), anti-foaming agent (s), viscosity modifier(s), reactive polymer(s) and any combination thereof.

In the context of the present invention, unless indicated otherwise, "%" indicates % weight/weight (w/w).

In the context of the present invention, the terms "about", "around", "approximately" or the symbol "~" can be used interchangeably, and are meant to comprise variations generally accepted in the field, e.g. comprising analytical errors and the like. Thus "about" may also indicate measuring uncertainty commonly experienced in the art, which can be in the order of magnitude of e.g. +/−1, 2, 5, 10, 20, or even 50 percent.

The term "comprising" is to be interpreted as specifying the presence of the stated parts, steps, features, components, or the like, but does not exclude the presence of one or more additional parts, steps, features, components etc. For example, a composition comprising a chemical compound may thus comprise additional chemical compounds.

With respect to lignin, lignin-components and/or lignin rich fractions, including methods of their provision and definitions, reference is made to application No. PCT/DK2015/050242, filed on 14 Aug. 2015. In the context of the present invention, the term "lignin" is meant to comprise the term "lignin-component" as defined in PCT/DK2015/050242, and both terms may be used interchangeably. In the context of the present invention, the term "lignin" is meant to comprise the term "lignin-component", and both terms may be used interchangeably. Thus, the term "lignin" in the present description and in the appended claims may also refers to the polymer denoted as such and being present in unprocessed lignocellulosic plant material. Furthermore, the term "lignin" shall also be understood to mean a "lignin" that has been subject to various physical and/or chemical treatments imposing changes of the lignin polymer structure, while mostly still retaining its polymer character and containing significant amounts of hemicellulose and cellulose.

Hence, "lignin", as used in the present description and in the appended claims may refer to a lignin that has been subjected to slight structural modifications.

Also, "lignin" as used in the present description and in the appended claims may refer to a lignin that has been subjected to slight structural modifications and/or comprising an amount of chemical residues originating from its mode of manufacture, or originating from compounds native for the lignocellulosic material from which it is isolated.

In some claims of the various aspects of the present invention, "lignin" may specifically exclude a Kraft lignin or a Kraft lignin fragment obtained from a Kraft processing of a lignocellulosic biomass.

In some embodiments of the various aspects of the present invention, "lignin" may specifically exclude lignosulfonate, such as a product obtainable from sulfite pulping. As in Kraft pulping, the temperature during sulfite pulping is 130-180° C. Usually, sulfite pulping is conducted at low pH (e.g. 1.5-5) in the presence of $HSO_3^-$ and/or $SO_3^{2-}$ ions. During sulfite pulping lignin is sulfonated, and the resulting lignosulfonate is water-soluble and has a high number of charged groups.

In some embodiments of the various aspects of the present invention "lignin" may specifically exclude soda lignin, a product obtainable from soda pulping. In this process, pulping occurs in an essentially sulfur-free medium, e.g. in contrast to the Kraft process, comprising only or predominantly soda.

In some embodiments of the various aspects of the present invention "lignin" may specifically exclude organosolv lignin, obtainable from a pulping process, where organic solvents and water are used to rid the lignin from cellulose. Temperatures during processing range e.g from 140° C. to 220° C. For enhancing solubilization of lignin, sulfuric acid may be added during the process. A number of organic solvents are suitable for such a process, such as acetic acid, formic acid, ethanol, peroxiorganic acids, acetone, methanol, butanol, ethylene glycol. Organosolv lignin possesses usually lower molecular weight and higher chemical purity. Organosolv lignins are typically hydrophobic and show low water-solubility.

Another process for obtaining lignin is by extraction in ionic liquids (producing ionic liquid lignin). Ionic liquids are salts, which are in liquid state at a relatively low temperature (e.g. below 100° C.). Lignin obtained with ionic liquids is believed to possess similar properties as organosolv lignin. However, regeneration of ionic liquid is problematic, and industrial scale production is therefore limited until further progress within this field has been achieved.

In some embodiments of the various aspects of the present invention "lignin" may specifically exclude ionic liquid lignin.

Whereas the term "lignin" in the present description and in the appended claims refers to the polymer denoted as such and being present in unprocessed lignocellulosic plant material, the term "lignin component" in the present description and in the appended claims has a broader meaning.

The term "lignin component" shall in the present description and in the appended claims be understood to mean a "lignin" that has been subject to various physical and/or chemical treatments imposing minor changes of the lignin polymer structure, however still retaining its polymer character and containing significant amounts of hemicellulose and cellulose.

Hence a "lignin component" as used in the present description and in the appended claims may refer to a lignin that has been subjected to slight structural modifications.

Also a "lignin component" as used in the present description and in the appended claims may refer to a lignin that has been subjected to slight structural modifications and/or comprising an amount of chemical residues originating from its mode of manufacture, or originating from compounds native for the lignocellulosic material from which it is isolated.

In some embodiments of the various aspects of the present invention a "lignin component" may specifically exclude a Kraft lignin or a Kraft lignin fragment obtained from a Kraft processing of a lignocellulosic biomass.

In some embodiments of the various aspects of the present invention a "lignin component" may specifically exclude a lignosulfonate.

In some embodiments of the various aspects of the present invention a "lignin component" may specifically exclude a soda lignin.

In the context of the present invention, the term "lignin" is meant to comprise a by-product from 2nd generation (2G) bioethanol production. There are various different 2nd generation bioethanol processes known in the art that may provide such a lignin component, incl. organosolv processes. Schemes for processing lignocellulosic biomass, including specific process steps as well as overall schemes for converting a lignocellulosic biomass to soluble saccharides and a fibrous fraction being or comprising the lignin component, are the subject of numerous published patents and patent applications. See e.g. WO 94/03646; WO 94/29474; WO 2006/007691; US2007/0031918; WO 2008/112291; WO 2008/137639; EP 2 006 354; US 2009/0326286; US 2009/0325251; WO 2009/059149; US 2009/0053770; EP 2 169 074; WO 2009/102256; US 2010/0065128; US 2010/0041119; WO 2010/060050; WO2007009463 A2, WO2007009463 A1; WO2011125056 A1; and WO2009125292 A2, WO 2014/019589 each of which is hereby incorporated by reference in entirety.

"Lignocellulosic biomass" refers to plant biomass comprising cellulose and lignin, and usually also hemicellulose and includes biomass, such as soft lignocellulosic biomass feedstocks, such as agricultural waste such as cereal straw, e.g. wheat, barley, rye or sorghum straw, grass, leaves, sugar cane bagasse, sweet sorghum bagasse, corn stover, and empty fruit bunches, municipal solid waste (MSW), digestate, other waste, etc. The term "biomass" also means other types of biomass, such as waste, sewage, manure.

"Soft lignocellulosic biomass" refers to plant biomass other than wood, which comprises cellulose and lignin, and usually also hemicellulose.

"Lignocellulosic biomass", such as soft lignocellulosic biomass feedstocks, such as agricultural waste such as cereal straw, e.g. wheat, barley, rye or sorghum straw, grass, leaves, sugar cane bagasse, sweet sorghum bagasse, corn stover, and empty fruit bunches, municipal solid waste (MSW), digestate, other waste or biomass, etc., are pretreated, usually preceded by a cleaning step, where e.g. sand, stones, foreign objects and the like are removed, and/or after a by single-stage autohydrolysis to xylan number 10% or higher typically comprise a small component of C6 monomers (1×), primarily glucose with some other sugars; a larger component of soluble C6 oligomers (about 2×-7×); a larger component of C5 monomers (about 4×-8×), primarily xylose with some arabinose and other sugars; and a much larger component of soluble xylo-oligomers (about 18×-30×) wherein "nx" refers to the number of sugar units, i.e. 1×=monomer, 2×=dimer, and so forth. Soluble xylo-oligomers typically include primarily xylohexose, xylopentose, xylotetraose, xylotriose and xylobiose with some higher chain oligomers. Xylo-oligomers can also be modified, such as esterified.

Different feedstocks can be pretreated using single-stage autohydrolysis to e.g. xylan number 10% or greater by a variety of different combinations of reactor residence times and temperatures. One skilled in the art will readily determine through routine experimentation an appropriate pretreatment routine to apply with any given feedstock, using any given reactor, and with any given biomass reactor-loading and reactor-unloading system. Where feedstocks are pretreated using a continuous reactor, loaded by either a sluice-system or a screw-plug feeder, and unloaded by either a "particle pump" sluice system or a hydrocyclone system, very low severity of 10% or greater xylan number can e.g. be achieved using typical strains of wheat straw or empty fruit bunches by a temperature of 180° C. and a reactor residence time of 24 minutes. For typical biomass feedstocks, such as soft lignocellulosic biomass from commonly used varieties of corn stover, sugar cane bagasse, and sweet sorghum bagasse, it is believed that low severities, such as xylan numbers >10% can be achieved using a temperature of around 180° C. and a reactor residence time of around 12 minutes, or using a temperature of around 175° C. and a reactor residence time of around 17 minutes. It will be readily understood by one skilled in the art that residence times and temperatures maybe adjusted to achieve comparable levels of Ro severity. Following pretreatment, pretreated biomass is separated into a solid fraction and a liquid fraction by a solid/liquid separation step. It will be readily understood that "solid fraction" and "liquid fraction" may be further subdivided or processed. In some embodiments, biomass may be removed from a pretreatment reactor concurrently with solid/liquid separation. In some embodiments, pretreated biomass is subject to a solid/liquid separation step after it has been unloaded from the reactor, typically using a simple and low cost screw press system, to generate a solid fraction and a liquid fraction. Cellulase enzyme activities are inhibited by liquid fraction, most notably due to xylo-oligomer content but possibly also due to phenol content and/or other compounds not yet identified. It can be advantageous to achieve the highest practicable levels of dry matter content in the solid fraction or, alternatively, to remove the highest practicable amount of dissolved solids from the solid fraction. In some embodiments, solid/liquid separation achieves a solid fraction having a DM content of at least 40%, at least 45%, at least 50% or at least 55%. Solid/liquid separation using ordinary screw press systems can typically achieve DM levels as high as 50% in the solid fraction, especially when the biomass feedstock has been pretreated and processed in such manner that fiber structure is maintained.

The term "digestate" is preferably used to mean the material remaining after the anaerobic digestion of a biodegradable feedstock. The digestate may advantageously be separated by separation means, such as filters, sedimentation tanks or the like into "dewatered digestate" and "reject water".

In the context of the present invention, the term "feedstock" or "substrate" preferably means a cellulosic, hemicellulosic, lignocellulosic or starch containing biomass and also oils and protein containing substrates and a fat, protein, sugar, cellulose, hemicellulose or starch containing biomass.

In this context, the term "waste" preferably means any kind of waste having an organic content, such as municipal solid waste (MSW), industrial waste, animal waste or plant waste.

In the context of the present invention, the term "anaerobic digestion" preferably refers to microbial activity, such as but not limited to fermentation under controlled aeration conditions, e.g. in absence or very limited amount of oxygen gas in which methane gas and/or hydrogen is produced. Methane gas is produced to the extent that the concentration of metabolically generated dissolved methane in the aqueous phase of the fermentation mixture within the "anaerobic digestion" is saturating at the conditions used and methane gas is emitted from the system.

The term "aerobic digestion" preferably refers to microbial fermentation conducted under aerated conditions.

The digestate or dewatered digestate can be subjected to a processing step and be fed back into a fermenter (AD (aerobic as well as anaerobic digestion), FAD, CSTR, CSTR/FAD hybrid), or even back to a microbial process producing a "bioliquid" (=the substrate for biogas production via AD)—e.g. a waste treatment facility, such as a MSW (municipal solid waste) treatment facility (e.g. à la REnescience process in which unsorted MSW is wetted and warmed to temperatures appropriate for enzymatic hydrolysis; through enzymatic action, biodegradable materials are liquefied, which permits easy separation of non-degradable solids). Such processing of unsorted MSW is considered a robust process. The absence of e.g. shredding and/or significant heat/pressure treatment may resulting in for example potatoes not being efficiently converted to "bioliquid".

As presented herein "digestate" can be separated by separation means into "dewatered digestate" and "reject water". The digestate or dewatered digestate can be subjected to a processing step and be fed back into a fermenter (AD, FAD, CSTR, CSTR included a FAD), or even back to a enzymatical and/or microbial process producing a "bioliquid" (e.g. the substrate for biogas production via AD) such as a waste treatment facility, such as a MSW (municipal solid waste) treatment facility (e.g. a REnescience process) essentially without significant heat/pressure treatment, resulting in for example raw potatoes or other vegetables not always being converted efficiently to "bioliquid".

"Dry matter," also appearing as "DM", refers to total solids, both soluble and insoluble, and effectively means "non-water content." Dry matter content is measured by drying at 105° C. until constant weight is achieved. "Fiber structure" is maintained to the extent that the average size of fiber fragments following pretreatment is >750 µm.

"Hydrothermal pretreatment" or sometimes only "pretreatment" commonly refers to the use of water, either as hot liquid, vapour steam or pressurized steam comprising high temperature liquid or steam or both, to "cook" biomass, at temperatures of 120° C. or higher, either with or without addition of acids or other chemicals. In the context of the present invention, "hydrothermal pretreatment" is meant to comprise methods, unit operations and/or processes relating to softening lignocellulosic biomass by the use of temperature and water, and usually, also, pressure, aiming at providing a pretreated biomass suitable for enzymatic digestion.

"Single-stage pressurized hydrothermal pretreatment" refers to a pretreatment in which biomass is subject to pressurized hydrothermal pretreatment in a single reactor configured to heat biomass in a single pass and in which no further pressurized hydrothermal pretreatment is applied following a solid/liquid separation step to remove liquid fraction from feedstock subject to pressurized hydrothermal pretreatment.

"Solid/liquid separation" refers to an active mechanical process, and/or unit operation(s), whereby liquid is separated from solid by application of force through e.g. pressing, centrifugation, sedimentation, decanting or the like. Commonly, a solid/liquid (s/l) separation provides a liquid and solid fraction.

"Solid fraction" and "Liquid fraction" refer to fractionation of pretreated and/or hydrolysed biomass in solid/liquid separation. The separated liquid is collectively referred to as "liquid fraction." The residual fraction comprising considerable insoluble solid content is referred to as "solid fraction". A "solid fraction" will have a substantial dry matter content and typically will also comprise a considerable residual of "liquid fraction" thus having the form of a solid or a slurry.

In the context of the present invention, "Xylan number" refers to a characterization of pretreated biomass determined as follows: Pretreated biomass is subject to solid/liquid separation to provide a solid fraction at about 30% total solids and a liquid fraction. This solid fraction is then partially washed by mixing with 70° C. water in the ratio of total solids (DM) to water of 1:3 wt:wt. The solid fraction washed in this manner is then pressed to about 30% total solids. Alternatively, the pretreated biomass can be subjected to solid/liquid separation to provide a solid fraction at about 50% total solids and a liquid fraction. With both methods, about 25% of the dissolved solids remain in the solid fraction with the suspended solids. Xylan content of the solid fraction washed in this manner can determined using e.g. the method of A. Sluiter, et al., "Determination of structural carbohydrates and lignin in biomass," US National Renewable Energy Laboratory (NREL) Laboratory Analytical Procedure (LAP) with issue date Apr. 25, 2008, as described in Technical Report NREL/TP-510-42618, revised April 2008, which is expressly incorporated by reference herein in entirety. This measurement of xylan content as described will include some contribution of soluble material from residual liquid fraction that is not washed out of solid fraction under these conditions. Accordingly, in the context of the present invention, the term "xylan number(s)" relates to (pre)treatment severities and relates to a composite measurement and/or values that reflect a weighted combination of both residual xylan content remaining within insoluble solids and also the concentration of soluble xylose and xylo-oligomers within the liquid fraction. At lower Ro severity, xylan number is higher. Thus, the highest xylan number refers to the lowest pretreatment severity. Xylan number provides a negative linear correlation with the conventional severity measure log Ro even to low severity, where residual xylan content within insoluble solids is above 10%. Generally, low, medium and high pretreatment severities provide xylan numbers of >10%, 6-10%, and <6%, respectively.

In particular, surprisingly and unexpectedly, the inventors have realized that the source of the lignin component has an influence on the quality of the bitumen composition. In particular, a less polar lignin appears more suitable, such as a bitumen composition, wherein said lignin component is not lignin from paper and pulp production, such as Kraft lignin, wherein said Kraft lignin being provided from biomass by a process known in the art as Kraft process/method (see e.g. Biermann, Christopher J. (1993) "Essentials of Pulping and Papermaking" San Diego: Academic Press, Inc.).

Without wanting to be bound by any theory, it is believed that an alkaline treatment has a negative effect on the lignin quality for uses related to the present invention, thus in some embodiments, said lignin component has not been provided by a Kraft method or another method comprising an alkaline treatment, such as by addition of NaOH or another base to provide a pH of around 10 or higher, at or around pH 11 or higher, or at or around pH 12 or higher.

Furthermore, it is believed that further modifications of the lignin or lignin component are not necessary to obtain a bitumen composition according to the present invention, thus some embodiments concern desired a lignin component has not been esterified and/or subjected to an esterification step, e.g. as disclosed in WO2015/094098. It is believed to be an advantage that no further steps are needed, such as said modification of the lignin.

It appears a complex, if not to say an impossible task to measure polarity of a complex composition such as lignin. However, the inventors have developed a method to assess polarity, based on lignin's ion exchange capacity (LIEC; see e.g. Experimental section for further details) and/or the phenolic hydroxyl content of lignin. It became apparent that Kraft lignin has a significantly higher LIEC as compared to the lignin used in the compositions of the present invention, e.g. 2G lignin that has not been subjected to an alkaline treatment. It is further believed that any wood, e.g. poplar wood and/or any other wood that e.g. is suitable for the paper industry, if processed without alkaline treatment and to a less severity, such as in a 2G process aiming at bioethanol production, will result in a lignin that is less polar, and thus suitable for providing a bitumen composition according to the present invention.

In the context of the present invention, the terms "two-stage pretreatment" or "two-step pretreatment" can be used interchangeably and are meant to comprise a process comprising two or more stage pretreatment steps, usually designed to provide improved C5 yields, such as processes disclosed in WO2010/113129; US2010/0279361; WO 2009/108773; US2009/0308383; U.S. Pat. No. 8,057,639 or US20130029406, wherein in these "two stage" pretreatment schemes, some C5-rich liquid fraction is removed by solid/liquid separation after a lower temperature pretreatment, followed by a subsequent, pretreatment of the solid fraction, usually at higher temperature and/or pretreatment severity.

In the context of the present invention, the terms "C5 bypass" or "C5 drain" can be used interchangeably, and are meant to comprise a process, wherein a usually C5-sugar rich liquid fraction is provided, such as through a liquid/solid separation step, e.g. by pressing, after and/or during pretreatment, which can be conducted as a single stage, or two-stage pretreatment process. PCT/DK2013/050256, filed on 1 Aug. 2013, published as WO 2014/019589, herewith incorporated by reference in its entirety, e.g. discloses such processes.

In the context of the present invention, the term "whole slurry" is meant to comprise a process, wherein pretreated biomass can be used directly in a subsequent hydrolysis step, such as an enzymatic hydrolysis and/or fermentation, such as e.g. disclosed in PCT/DK2014/050030, filed on 5 Feb. 2014, published as WO2015/014364, herewith incorporated by reference in its entirety.

According to the invention, said pretreatment and/or hydrolysis of biomass may be performed with or without addition of one or more acid(s) or on or more base(s), such as $H_2SO_4$, HCl, $NH_3$, $NH_4OH$, NaOH, KOH, $Ca_2(OH)$ and the like.

"Autohydrolysis" refers to a pretreatment process of lignocellulosic biomass, in which acetic acid is liberated from hemicellulose during said process, which is believed to further catalyse and/or improve hemicellulose hydrolysis. Autohydrolysis of lignocellulosic biomass is thus conducted without or essentially without addition of any further chemicals, such as acid(s) or base(s), and is commonly performed at a pH between 3.5 and 9.0.

"Commercially available cellulase preparation optimized for lignocellulosic biomass conversion" refers to a commercially available mixture of enzyme activities which is sufficient to provide enzymatic hydrolysis of pretreated lignocellulosic biomass and which usually comprises endocellulase (endoglucanase), exocellulase (exoglucanase), endoxylanase, acetyl xylan esterase, xylosidase and β-glucosidase activities. The term "optimized for lignocellulosic biomass conversion" refers to a product development process in which enzyme mixtures have been selected and/or modified for the specific purpose of improving hydrolysis yields and/or reducing enzyme consumption in hydrolysis of pretreated lignocellulosic biomass to fermentable sugars.

The term "Cellulase(s)" is meant to comprise one or more enzymes capable of degrading cellulose and/or related compounds. Cellulase is any of several enzymes commonly produced by fungi, bacteria, and protozoans that catalyse cellulolysis, the decomposition of cellulose and/or related polysaccharides. Cellulase can also be used for any mixture or complex of various such enzymes, that act serially or synergistically to decompose cellulosic material. Cellulases break down the cellulose molecule into monosaccharides ("simple sugars") such as beta-glucose, and/or shorter polysaccharides and oligosaccharides. Specific reactions may comprise hydrolysis of the 1,4-beta-D-glycosidic linkages in cellulose, hemicellulose, lichenin, and cereal beta-D-glucans. Several different kinds of cellulases are known, which differ structurally and mechanistically. Synonyms, derivatives, and/or specific enzymes associated with the name "cellulase" comprise endo-1,4-beta-D-glucanase (beta-1,4-glucanase, beta-1,4-endoglucan hydrolase, endoglucanase D, 1,4-(1,3,1,4)-beta-D-glucan 4-glucanohydrolase), carboxymethyl cellulase (CMCase), avicelase, celludextrinase, cellulase A, cellulosin AP, alkali cellulase, cellulase A 3, 9.5 cellulase, and pancellase SS.

Cellulases can also be classified based on the type of reaction catalysed, where endocellulases (EC 3.2.1.4) randomly cleave internal bonds at amorphous sites that create new chain ends, exocellulases or cellobiohydrolases (EC 3.2.1.91) cleave two to four units from the ends of the exposed chains produced by endocellulase, resulting in tetra-, tri- or disaccharides, such as cellobiose. Exocellulases are further classified into type I—that work processively from the reducing end of the cellulose chain, and type II—that work processively from the nonreducing end. Cellobiases (EC 3.2.1.21) or beta-glucosidases hydrolyse the exocellulase product into individual monosaccharides. Oxidative cellulases depolymerize cellulose by radical reactions, as for instance cellobiose dehydrogenase (acceptor). Cellulose phosphorylases depolymerize cellulose using phosphates instead of water.

The term "Hemicellulase(s)" is meant to comprise one or more enzymes capable and/or contributing to breaking down hemicellulose, one of the major components of plant cell walls. Some of the main polysaccharides that constitute hemicellulose are believed to be xylan, arabinoxylan, xyloglucan, glucuronoxylan and glucomannan. In the context of the present invention, the term "hemicellulase(s)" is meant to comprise: xylanase(s), xylosidase(s), arabinoxylanase(s), xyloglucanase(s), glucoronoxylanase(s), glucomannanase(s), and/or esterase(s), including any combination thereof.

In the following section, further embodiments of the different aspect of the invention are disclosed in detail.

In a first aspect, the present invention concerns a composition comprising bitumen, one or more plasticity modifying agent(s), lignin, and optionally one or more further component(s); wherein said lignin is obtained by a process for treatment of a lignocellulosic biomass, said process comprising:
 a) subjecting lignocellulosic biomass to hydrothermal pretreatment resulting in a hydrothermally pretreated lignocellulosic biomass; followed by
 b) subjecting at least part of said hydrothermally pretreated lignocellulosic biomass obtained in step (a) to a hydrolysis resulting in a liquid fraction comprising soluble carbohydrates, and a fiber fraction comprising a lignin component, wherein said hydrolysis is an acid catalyzed hydrolysis and/or enzymatic hydrolysis; followed by
 c) optionally subjecting at least part of the liquid fraction obtained in step (b) to a fermentation in order to ferment at least part of said soluble carbohydrates to a fermentation product, such as ethanol, methane or butanol, thereby obtaining a fermentation broth.

In one embodiment, the present invention concerns a composition comprising bitumen, one or more plasticity modifying agent(s), lignin, and optionally one or more further component(s); wherein said lignin is obtained by a process for treatment of a lignocellulosic biomass, said process comprising:
 a) subjecting lignocellulosic biomass to hydrothermal pretreatment at a pH within the range of 3.5 to 9.0, at a temperature between 150 and 260° C., preferably 150-200° C., for a residence time of less than 60 minutes resulting in a hydrothermally pretreated lignocellulosic biomass; followed by
 b) subjecting at least part of said hydrothermally pretreated lignocellulosic biomass obtained in step (a) to a hydrolysis resulting at a temperature between 30 and 72° C. for period between 24 and 150 hours in a liquid fraction comprising soluble carbohydrates, and a fiber fraction comprising a lignin component, wherein said hydrolysis is an acid catalyzed hydrolysis and/or enzymatic hydrolysis; followed by
 c) optionally subjecting at least part of the liquid fraction obtained in step (b) to a fermentation in order to ferment at least part of said soluble carbohydrates to a fermentation product, such as ethanol, methane or butanol, thereby obtaining a fermentation broth.

In some embodiments, said at least part of said lignin fraction is isolated from the fiber fraction obtained in step (b).

In some embodiments, said at least part of said lignin fraction is isolated from said fermentation broth obtained in step (c).

In some embodiments, said hydrothermal pretreatment of said lignocellulosic biomass is performed at a temperature of 150-260° C., such as 160-250° C., 150-200° C., or e.g. 170-240° C., such as 180-230° C., for example 190-220° C., such as 200-210° C.

In some embodiments, said hydrothermal pretreatment of said lignocellulosic biomass is performed in a period of residence time of 2-120 min., such as 5-110 min., e.g. 10-100 min., for example 15-90 min., such as 20-80 min., such as 25-70 min., e.g. 30-60 min, such as 35-50 min, such as 40-45 min.

In some embodiments, soaking/wetting with an aqueous solution can serve to adjust pH prior to pretreatment to the range of between 3.5 and 9.0, which is typically advantageous for autohydrolysis. It will be readily understood that pH may change during pretreatment, typically to more acidic levels as acetic acid is liberated from solubilized hemicellulose. Further suitable pH values may be disclosed elsewhere herein.

Suitable hydrothermal pretreatment reactors typically include most pulping reactors known from the pulp and paper industry. In some embodiments, hydrothermal pretreatment is administered by steam within a reactor pressurized to 10 bar or lower, or to 12 bar or lower, or to 4 bar or higher, or 8 bar or higher, or between 8 and 18 bar, or between 18 and 20 bar. In some embodiments, the pretreatment reactor is configured for a continuous inflow of feedstock.

In some embodiments, said hydrothermal pretreatment of said lignocellulosic biomass is performed by subjecting said lignocellulosic biomass to a log severity, log(Ro) of 2.5 or more, such as a log(Ro) of 2.6 or more, e.g. a log(Ro) of 2.7 or more, such as a log(Ro) of 2.8 or more, for example a log(Ro) of 2.9 or more, such as a log(Ro) of 3.0 or more, such as a log(Ro) of 3.1 or more, for example a log(Ro) of 3.2 or more, e.g. a log(Ro) of 3.3 or more, such as a log(Ro) of 3.4 or more, such as a log(Ro) of 3.5 or more; such as a log(Ro) of 3.6 or more; for example such as a log(Ro) of 3.7 or more, e.g. a log(Ro) of 3.8 or more, for example a log(Ro) of 3.9 or more, for example a log(Ro) of 4.0 or more, such as a log(Ro) of 4.1 or more, or a log(Ro) of 4.2 or more; wherein the log severity is defined as: log(Ro)=(residence time)×(exp[Temperature−100/14.75]). In some further embodiments, said hydrothermal pretreatment of said lignocellulosic biomass results in a xylan number of: 5% or more, 6% or more, 7% or more, 8% or more, 9% or more, 10% or more. The xylan number may be in the range of 5-20%, 5-15%, 5-12.5%, 5-10%. In an alternative, the xylan number may be in the range of 8-20, 8-15 or 8-12.5%.

In some embodiments, the pretreatment is conducted at a dry matter (DM) content in the range of 5-80%, such as 10-70%, such as 20-60%, or such as 30-50%, or at a DM content around 5%, 10%, 15%, 20%, 25%, 30%, 35%, 40%, 45%, 50%, 55%, 60%, 65%, 70%, 75%, 80% or at a DM content of more than 80%. In some other embodiments, the pretreatment is conducted at a DM content of 5-10%, 10-20%, 20-30%, 30-40%, 40-50%, 50-60%, 60-70%, or even 70-80%. In some further embodiments, the pretreatment is conducted at a DM content of or around 5%, 10%, 15%, 20%, 25%, 30%, 35%, 40%, 45%, 50%, 55%, 60%, 65%, 70%, 75%, 80% or at a DM content of more than 80%.

In some embodiments, said hydrolysis comprises the action of one or more cellulase(s). In some further embodiments, said one or more cellulases are selected from the group comprising exo-glucanases, endo-glucanases, hemicellulases and beta-glucosidases.

In some embodiments, said hydrolysis is performed for a period of time of 1-200 hours, such as 5-190 hours, such as 10-185 hours, e.g. 15-180 hours, for example 20-175 hours, such as 25-170 hours, such as 30-165 hours, e.g. 35-160 hours, for example 40-155 hours, such as 45-150 hours, such as 50-145 hours, e.g. 55-140 hours, for example 60-135 hours, such as 65-130 hours, such as 70-125 hours, e.g. 75-120 hours, for example 80-115 hours, such as 85-110 hours, such as 90-105 hours, e.g. 95-100 hours.

In some embodiments, said step (b) and step (c) are performed as a separate hydrolysis and fermentation step (SHF), and wherein said hydrolysis is performed at a temperature of 30-72° C., such as 32-70° C., e.g. 34-68° C., for example 36-66° C., such as 38-64° C., e.g. 40-62° C., 42-60° C., e.g. 44-58° C., for example 46-56° C., such as 48-54° C., e.g. 50-52° C.

In some embodiments, said hydrolysis is performed in a period of time of 70-125 hours, e.g. 75-120 hours, for example 80-115 hours, such as 85-110 hours, such as 90-105 hours, e.g. 95-100 hours.

In some embodiments, said hydrolysis is conducted at a pH in the range of at least pH 3.0, such as in the range of pH 3.0-6.0, such as pH 4.0-5.5, and/or such as pH 4.2-5.4.

In some embodiments, said is conducted at a pH of around 4.2, 4.5, 4.7, 4.8, 4.9, 5.0, 5.1, 5.2, 5.3 or 5.4.

In some embodiments, said hydrolysis is conducted at a suitable dry matter (DM) content, such as a DM content of at least 10%, such as 15%. In some embodiments, the DM content is around 15-45%, 20-40%, 25-35%, and/or at a DM content around 15%, 20%, 25%, 30%, 35%, or 40%. In some embodiments, the DM content is around 40% or higher.

In some embodiments, said step (b) and step (c) are performed as a simultaneous saccharification and fermentation step (SSF), and wherein said hydrolysis is performed at a temperature of 30-72° C., such as 32-70° C., e.g. 34-68° C., for example 36-66° C., such as 38-64° C., e.g. 40-62° C., 42-60° C., e.g. 44-58° C., for example 46-56° C., such as 48-54° C., e.g. 50-52° C.

In some embodiments, said hydrolysis is performed in a period of time of 1-12 hours, such as 2-11 hours, for example 3-10 hours, such as 4-9 hours, e.g. 5-8 hours, such as 6-7 hours.

In some embodiments, said step (b) and step (c) are performed as a simultaneous saccharification and fermentation step (SSF), and wherein said fermentation is performed at a temperature of 25-40° C., such as 26-39° C., e.g. 27-38° C., for example 28-37° C., e.g. 29-36° C., for example 30-35° C., such as 31-34° C. or 32-33° C.

In some embodiments, said fermentation is performed in a period of time of 100-200 hours, such as 105-190 hours, such as 110-185 hours, e.g. 115-180 hours, for example 120-175 hours, such as 125-170 hours, such as 130-165 hours, e.g. 135-160 hours, for example 140-155 hours, such as 145-150 hours.

In some embodiments, microbial fermentation is conducted under conditions that discourage methane production by methanogens, for example, at pH less than 6.0, or at pH less than 5.8, or at pH less than 5.6, or at pH less than 5.5. Thus, the pH may preferably be in the range of 1-6, preferably 2-6, more preferred 3.5-5.5 or most preferred 4-5.5.

In some embodiments, said process for treatment of a lignocellulosic biomass comprises a "C5 bypass", i.e. comprises a solid/liquid separation step before step (b), wherein the liquid fraction is not subjected to said hydrolysis in step (b).

In some embodiments, said process comprises a two (or more) step treatment, and optionally, wherein a liquid fraction is collected after a first pretreatment step, e.g. by pressing.

In some embodiments, said process is conducted as "whole slurry" process, i.e. wherein the pretreated biomass is subjected directly in a subsequent hydrolysis step, such as an enzymatic hydrolysis and/or fermentation.

In some embodiments, said lignin is obtained from soft lignocellulosic biomass, such as a biomass used or suitable for $2^{nd}$ generation bioethanol production, or from a process comprising essentially no addition of acid or base during pretreatment.

In some embodiments, the lignocellulosic material is soft lignocellulosic biomass, e.g. agricultural waste such as one or more of wheat straw, corn stover, corn cobs, empty fruit bunches, rice straw, oat straw, barley straw, canola straw, rye straw, sorghum, sweet sorghum, soybean stover, switch grass, Bermuda grass and other grasses, bagasse, beet pulp, corn fiber, or any combinations thereof. In some embodiments, the lignocellulosic biomass may also be predominantly or entirely ensiled biomass, or comprise ensiled biomass, such as at least 5, 10, 25, 50%, 75%, 90%, 95%, 99% or more ensiled biomass.

In some embodiments, the lignocellulosic material is not soft lignocellulosic biomass. Examples of such non-soft lignocellulosic biomass comprise e.g. wood, wood chips, bark, branches, but also paper, newsprint, cardboard, or even municipal waste, such as sorted or unsorted municipal waste, or office wastes. In some embodiments, the lignocellulosic biomass may also be predominantly or entirely non-soft lignocellulosic biomass, or comprise non-soft lignocellulosic biomass, such as at least 5, 10, 25, 50% or more than 50% non-soft lignocellulosic biomass.

In a second aspect, the present invention relates to a the composition comprising bitumen, one or more plasticity modifying agent(s), lignin, and optionally one or more further component(s); wherein said lignin has a Lignin Ion Exchange Capacity (LIEC) of 0.4 mol/kg dry matter (DM) or less.

In some embodiments, said lignin has a Lignin Ion Exchange Capacity (LIEC) of 0.35 mol/kg dry matter (DM) or less, such as 0.30 mol/kg DM or less, such as 0.25 mol/kg DM or less, such as 0.20 mol/kg DM or less, or such as 0.15 mol/kg DM or less.

In some embodiments, said lignin has a Lignin Ion Exchange Capacity (LIEC) in the range of 0.05-0.40, preferably 0.05-0.30, more preferred 0.05-0.20, or especially preferred 0.05-0.15 mol/kg DM.

In some embodiments, said lignin has a phenolic OH (phOH) content of 2 mmol/g or less, preferably 1.75 mmol/g or less, especially preferred 1.5 mmol/g or less.

In other embodiments, said lignin has a phenolic OH (phOH) content in the range of 0.50-2.0 mmol/g, preferably 0.50-1.75 mmol/g, especially preferred 0.50-1.50 mmol/g or 0.1-1.50 mmol/kg.

In some embodiments, said lignin has a sulphur (S) content of 0.4% or less. In other embodiments, said lignin has a sulphur content of 0.35% or less, such as 0.30% or less, such as 0.25% or less, such as 0.20% or less, such as 0.15% or less (w/w).

In some embodiments, said lignin has a sulphur content in the range of 0.05-0.40%, preferably 0.05-0.30%, or especially preferred 0.05-0.20% (w/w).

In some embodiments, the bitumen can be e.g. straight run bitumen, hard bitumen, oxidised bitumen, cut-back bitumen or fluxed bitumen.

In some embodiments, said further component(s) being one or more aggregate(s) and/or filler(s), such as natural, manufactured and/or recycled aggregates, including any combination thereof. Suitable aggregates and/or fillers can be such commonly used in the field. They can e.g. be one or more of coarse aggregate, fine aggregate, all-in aggregate, and filler aggregate, thus they may comprise a mixture of different aggregates and/or fillers.

In some embodiments the aggregate or filler comprises igneous, sedimentary, and/or metamorphic rock, such as Granite, Syenite, Granodiorite, Diorite, Gabbro, Dolerite, Diabase, Rhyolite, Trachyte, Andesite, Dacite, Basalt; Sandstone, Gritstone, Conglomerate, Breccia, Arkose, Greywacke, Quartzite (ortho), Shale, Siltstone, Limestone, Chalk, Dolomite, Chert, Flint, and Amphibolites, Gneiss, Granulite, Hornfels, Marble, Quartzite (meta), Serpentinite, Schist, Slate; including any combination thereof.

In some embodiments, said one or more further component(s) can also be, or comprise one or more active component (s).

In some embodiments, said composition(s) comprises or consists of: (a) 1-99.89% (w/w) bitumen; (b) 0.01-20% (w/w) plasticity modifying agent(s); (c) 0.1-50% (w/w) lignin; and (d) 0-95% (w/w) further component(s).

In some embodiments, said composition(s) comprises or consists of: (a) 25-99.89% (w/w) bitumen; (b) 0.01-20% (w/w) plasticity modifying agent(s); (c) 0.1-50% (w/w) lignin; wherein the w/w % of (a), (b) and/or (c) is calculated as weight per total weight of the sum of bitumen (a), plasticity modifying agents (b) and lignin (c).

In some embodiments, said composition(s) comprises or consists of: (a) 25-99.89% (w/w) bitumen; (b) 0.01-20% (w/w) plasticity modifying agent(s); (c) 0.1-50% (w/w) lignin; 0-95% (w/w) further component(s), wherein the w/w % of (a), (b) and/or (c) is calculated as weight per total weight of the sum of bitumen (a), plasticity modifying agents (b) and lignin (c), i.e. excluding the further component(s).

In some embodiments, said composition(s) comprises 25-99.89, 60-94, or 74-86% (w/w) bitumen.

In some embodiments, said composition(s) comprises 0.01-20, 1-10, or 4-6% (w/w) plasticity modifying agent(s).

In some embodiments, said composition comprises 0.1-50, 5-30, or 10-20% (w/w) lignin.

In some embodiments, said composition comprises 0-99 or 1-95% (w/w) further component(s).

In some embodiments, said composition comprises 0-20, 0.1-15, 1-10, or 2-5% (w/w) active component.

In some embodiments, said composition comprises 0-99, or 0-98, 0-97, 0-96, 0-95, 0-94, 0-93, 0-92, 0-91, 0-90, 0-10, 10-20, 20-30, 30-40, 40-50, 50-60, 60-70, 70-80, 80-90, 80-98, 85-97 or 90-95% (w/w) aggregate and/or filler.

Compositions according to the first or second aspect of the invention can be suitable for e.g. road construction, sealing work and the like, and/or any use according to e.g. the third aspect of the invention.

In some embodiments, the (i) bitumen; (ii) bitumen and plasticity modifying agent (such as a polymer-modified bitumen (PMB)); (iii) the bitumen comprising lignin; the PMB and lignin; and/or said composition itself may have one or more characteristics as specified in any one of EN 12591, EN 13924, EN 14023, IS 73:2006, ASTM D946-09, ASTM D3381-09 and M 226-80, EN 12591:2009a (BSI, 2009a), EN 13924:2006 (BSI, 2006), EN 14023:2010 (BSI, 2010a), EN 13304:2009 (BSI, 2009b), EN 13305:2009 (BSI, 2009c), EN 15322:201 3 (BSI, 2013), EN 14023:2010 (BSI, 2010a), EN 14771:2012 (BSI, 2012a), EN 14770:2012 (BSI, 2012b), EN 13589:2008 (BSI, 2008), EN 13703:2003 (BSI, 2003), EN 13587:2010 (BSI, 2010b), or EN 13398: 2010 (BSI, 2010c). In some further embodiments, said bitumen, PMB, bitumen comprising lignin, the PMB comprising lignin, or said composition is of grade 20/30, 30/45, 35/50, 40/60, 50/70, 70/100, 100/150, 160/220, 250/330, or 330/430.

In some embodiments, said one or more plasticity modifying agent is one or more plastomer, one or more thermoplastic elastomer, one or more rubber, one or more viscosity modifier, and/or one or more reactive polymer, including any combination thereof.

In some embodiments, said plastomer is e.g. one or more of ethylene-vinyl acetate (EVA), ethylene-methyl acrylate (EMA), ethylene-butyl acrylate (EBA), atactic polypropylene (APP), polyethylene (PE), polypropylene (PP), polyvinyl chloride (PVC), and polystyrene (PS). In some further embodiments, said one or more plastomer is selected from one or more of: EVA, EMA, EBA, APP, PE, PP, PVC, and PS, including any combination thereof.

In some embodiments, said thermoplastic elastomers is e.g. one or more of butadiene elastomer (SBE), linear or radial styrene-butadiene-styrene elastomer (SBS), styrene-butadiene rubber (SBR), styrene-isoprene-styrene elastomer (SIS), styrene-ethylene-butadiene-styrene elastomer (SEBS), ethylene-propylene-diene terpolymer (EPDM), isobutene-isoprene random copolymer (IIR), polyisobutene (PIB), polybutadiene (PBD), polyisoprene (PI). In some further embodiments, said one or more thermoplastic elastomers is selected from one or more of: SBE, SBS; SBR, SIS, EBS, EPDM, IIR, PIB, PBD, and PI, including any combination thereof.

In some embodiments, said rubber is a natural rubber, such as latex, or a synthetic rubber, such as recycled tire rubber or recycled crumb rubber.

In some embodiments, said viscosity modifier is one or more flux oil (aromatics, napthenics, parrafinics), or Fischer-Tropsch waxes, including any combination thereof.

In some embodiments, said reactive polymer is one or more random terpolymer of ethylene, acrylic ester and glycidyl methacrylate, or maleic anhydride-grafted styrene-butadiene-styrene copolymer, including any combination thereof.

In some embodiments, said active component is selected from the group comprising or consisting of one or more dispersing agent(s), surfactant(s), hydrotropic agent(s), emulsifier(s), preserving agent(s), anti-foaming agent (s), viscosity modifier(s), reactive polymer(s) and any combination thereof.

In some embodiments, said one or more further component or active component is present in the range of 0.001% to 5% (w/w).

In some embodiments, said one or more plasticity modifying agent(s), the lignin, and the optional one or more further component and/or active agent are in a state of being intermixed. In some further embodiments, said state of being intermixed is selected from the group comprising or consisting of being intermixed as a solution; being intermixed as a suspension; being intermixed as an emulsion; being intermixed as a dispersion; being intermixed as a slurry; and any combination thereof.

In some embodiments, said one or more dispersing agent is selected from the group comprising or consisting of non-ionic, anionic, cationic and amphoteric dispersing agent (s) and any combination and/or compatible mixture thereof. In some further embodiments, said one or more dispersing agent is present in said composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, calculated either including or excluding said optional aggregate(s) and/or optional filler(s).

In some embodiments, said one or more surfactant is selected from the group comprising or consisting of anionic, cationic, zwitterionic and nonionic surfactants, and any combination and/or compatible mixture thereof. In some embodiments, said one or more surfactant is present in said composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, calculated either including or excluding said optional aggregate(s) and/or optional filler(s).

In some embodiments, said one or more hydrotropic agent is selected from the group comprising or consisting of: non-ionic, anionic, cationic and amphoteric hydrotropes and any combination and/or compatible mixtures thereof. In some further embodiments, said one or more hydrotropic agent is present in said composition in an amount of 10-50,000 ppm or 200-40,000 ppm, such as 300-30,000 ppm, e.g. 400-20,000 ppm, for example 500-15,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, calculated either including or excluding said optional aggregate(s) and/or optional filler(s).

In some embodiments, said one or more emulsifier is selected from the group comprising or consisting of sodium phosphate(s), sodium stearoyl lactylate cationic, lecithin, DATEM (diacetyl tartaric acid ester of monoglyceride), and any combination and/or compatible mixture thereof. In some further embodiments, said one or more emulsifier is present in said composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, calculated either including or excluding said optional aggregate(s) and/or optional filler(s).

In some embodiments, said one or more preserving agent is selected from the group comprising or consisting of one or more carboxylate, benzoate, benzoic acid derivative such as parabene(s), aldehyde(s), thiazine(s), organic acid(s) and the like, and any combination thereof. In some further embodiments, said one or more preserving agent is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

In some embodiments, said one or more anti-foaming agent is selected from the group comprising or consisting of active silicone polymer(s), siloxane polymer(s), organo-modified siloxane(s), non-silicone compound(s)/composition(s) comprising polypropylene-based polyether dispersions, fatty acid-type antifoam, non-ionic emulsifier, and any combination thereof. In some further embodiments, said one or more anti-foaming agent is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

In some embodiments, said one or more viscosity modifier is selected from the group comprising or consisting of one or more flux oil, such as aromatics, napthenics, parrafinics, or any combination of said aromatics, napthenics, parrafinics, Fischer-Tropsch waxes, and any combination thereof. In some further embodiments, said one or more viscosity modifier is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

In some embodiments, said one or more reactive polymer(s) is selected from the group comprising or consisting of one or more of: random terpolymer of ethylene, acrylic ester and glycidyl methacrylate, and maleic anhydride-grafted styrene-butadiene-styrene copolymer, and any combination thereof. In some further embodiments, said one or more reactive polymer is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

In some embodiments, said lignin can be a lignin-rich fraction obtained or obtainable from a process comprising the steps of (i) pretreating plant biomass and (ii) enzymatic hydrolysis of at least a fraction of the pretreated biomass from step (i), such as a $2^{nd}$ generation bioethanol production.

In some embodiments, said lignin is a lignin component as disclosed in PCT/DK2015/050242, such as a lignin component disclosed in any one of claims 1-157 of said PCT application.

In some claims, said lignin is not lignin from paper and pulp production, such as Kraft lignin, wherein said Kraft lignin being provided from biomass by a process known in the art as Kraft process/method. In some further embodiments, said lignin is not Kraft lignin, lignosulfonate, or soda lignin. In yet some further embodiments, said lignin has not been provided by a Kraft method or another method comprising an alkaline treatment, such as by addition of NaOH or another base to provide a pH of around 10 or higher, at or around pH 11 or higher, or at or around pH 12 or higher.

In some embodiments, said lignin has not been chemically modified, such as esterified and/or subjected to an esterification step, such as disclosed in WO2015/094098.

In some embodiments, said lignin has a Lignin Ion Exchange Capacity (LIEC) of 0.4 mol/kg dry matter (DM) or less, 0.3 mol/kg dry matter (DM) or less, such as 0.25 mol/kg DM or less, such as 0.20 mol/kg DM or less, such as 0.15 mol/kg DM or less, or such as 0.10 mol/kg DM or less. In some further embodiments, said lignin has a LIEC in the range of 0.05-0.40, 0.10-0.30, or 0.10-0.20 mol/kg DM. In some further embodiments, the Lignin Ion Exchange Capacity is around 0.40, 0.35, 0.30, 0.25, 0.20, 0.15, 0.10, mol/kg dry matter or less; in the range of 0.10-0.20, 0.20-0.30, 0.30-0.40 mol/kg dry matter; and/or in the range of 0.05-0.40, 0.10-0.30, or 0.10-0.20 mol/kg DM. In some further embodiments, said lignin is significantly less polar than Kraft lignin, such as assessed by LIEC measurement, such as having a LIEC at least 0.10, 0.11, 0.12, 0.13, 0.14, 0.15, 0.16, or 0.17 mol/kg DM lower than the LIEC of Kraft lignin. Without wanting to be bound by any theory, it is believed that the lower polarity and/or lower LIEC contribute to the surprising and unexpected suitability of e.g. 2G lignin for bitumen-related applications according to the present invention.

In some embodiments, said lignin is significantly less hygroscopic, such as binding at least 20, 25, 30, 35, 40, 45, 50, 55, 60, 65, 70, 75, 80, 85, 90, 95 or 100% (w/w) less water when compared to Kraft lignin. In some further embodiments, said lignin is swelling significantly less than Kraft lignin, such as swelling at least 20, 25, 30, 35, 40, 45, 50, 55, 60, 65, 70, 75, 80, 85, 90, 95 or 100% less, and optionally wherein said swelling is determined as change in particle size upon suspension in water or another suitable medium after 60 min. Without wanting to be bound by any theory, it is believed that it can be advantageous in the context of the present invention that the lignin is less hygroscopic, and swells less.

In some embodiments, said lignin comprises cellulose in an amount of 2,000-300,000 ppm, such as 3,000-180,000 ppm, e.g. 4,000-160,000 ppm, for example 5,000-140,000 ppm, such as 6,000-120,000 ppm, 7,000-100,000 ppm, for example 8,000-80,000 ppm, such as 9,000-70,000 ppm, e.g. 10,000-60,000 ppm, 12,000-50,000 ppm, such as 14,000-50,000 ppm, e.g. 16,000-40,000 ppm, 18,000-30,000 ppm, such as 20,000-28,000 ppm, for example 22,000-26,000 ppm (w/w).

In some embodiments, said lignin comprises hemicellulose in an amount of 2,000-200,000 ppm, such as 3,000-180,000 ppm, e.g. 4,000-160,000 ppm, for example 5,000-140,000 ppm, such as 6,000-120,000 ppm, 7,000-100,000 ppm, for example 8,000-80,000 ppm, such as 9,000-70,000 ppm, e.g. 10,000-60,000 ppm, 12,000-50,000 ppm, such as 14,000-50,000 ppm, e.g. 16,000-40,000 ppm, 18,000-30,000 ppm, such as 20,000-28,000 ppm, for example 22,000-26,000 ppm (w/w).

In some embodiments, said lignin comprises ash in an amount of 2,000-200,000 ppm, such as 3,000-180,000 ppm, e.g. 4,000-160,000 ppm, for example 5,000-140,000 ppm, such as 6,000-120,000 ppm, 7,000-100,000 ppm, for example 8,000-80,000 ppm, such as 9,000-70,000 ppm, e.g. 10,000-60,000 ppm, 12,000-50,000 ppm, such as 14,000-

50,000 ppm, e.g. 16,000-40,000 ppm, 18,000-30,000 ppm, such as 20,000-28,000 ppm, for example 22,000-26,000 ppm (w/w).

In some embodiments, said lignin has a dry matter (dm) of at least 80% (w/w) or more, such as at least 85% (w/w), such as at least 90% (w/w), such as at least 92.5% (w/w), such as at least 95% (w/w), such as at least 96% (w/w), such as at least 97% (w/w), such as at least 98% (w/w), or such as at least 99% (w/w). In some further embodiments, the dry matter content of said lignin is 1.0-99% (w/w), 10-99% (w/w) or 20-95% (w/w), such as 21-94% (w/w), e.g. 22-93% (w/w), such as 23-92% (w/w), such as 24-91% (w/w), for example 25-90% (w/w), such as 26-89% (w/w), such as 27-88% (w/w), for example 28-87% (w/w), e.g. 29-86% (w/w), such as 30-85% (w/w), such as 31-84% (w/w), such as 32-83% (w/w), such as 33-82% (w/w), for example 34-81% (w/w), such as 35-80% (w/w). For some applications, a very high dry matter, such as more than 95, 96, 97, 98, or 99% dm (w/w) may seem advantageous.

In some embodiments, said lignin is in the form of pellets, granulate, powder, dried filter cake, or dried decanter cake. In some further embodiments, said lignin is having an average grain size of 1-2000 µm, 1-1500 µm, 1-1200 µm, 1-1000 µm, 1-800 µm, 1-600 µm, 1-500 µm, 1-450 µm, such as 1.5-430 µm, e.g. 2-420 µm, such as 3-410 µm, for example 4-400 µm, e.g. 5-390 µm, such as 6-380 µm, e.g. 7-370 µm, such a 8-360 µm, 9-350 µm, for example 10-340 µm, e.g. 12-330 µm, such as 14-320 µm, such as 16-310 µm, for example 18-300 µm, e.g. 20-290 µm, such as 22-280 µm, e.g. 25-270 µm, such a 30-260 µm, 35-250 µm, for example 40-240 µm, e.g. 45-230 µm, such as 50-220 µm, for example 60-210 µm, for example 70-200 µm, e.g. 80-190, for example 90-180 µm, e.g. 100-170 µm, such a 110-160 µm, 120-150 µm, for example 130-140 µm. In still some further embodiments, said average grain or particle size is determined before or after providing said bitumen composition, and optionally, wherein said grain or particle size being measured by laser diffraction spectroscopy, or e.g. by a Malvern Mastersizer.

In some embodiments, said lignin is having an average molecular weight (Da) of 1,000 or above, 1,500 or above, 2,000 or above, 2,500 or above, 3,000 or above, such as 3,500 or above, e.g. 4,000 or above, such as 5,000 or above, for example 5,500 or above, such as 6,000 or above, e.g. 7,000 or above, for example 8,000 or above, such as 9,000 or above, for example 10,000 or above, such as 12,000 or above, e.g. 14,000 or above, for example 16,000 or above, e.g. 18,000 or above, e.g. 20,000 or above, such as 25,000 or above, e.g. 30,000 or above, such as 35,000 or above, for example 40,000 or above, such as 45,000 or above, e.g. 50,000 or above, such as 55,000 or above, e.g. 60,000 or above, such as 65,000 or above, e.g. 70,000 or above, such as 75,000 or above, for example 80,000 or above, such as 85,000 or above, e.g. 90,000 or above, such as 95,000 or above, or 100,000 or above.

In some embodiments, said lignin originates from a lignocellulosic biomass obtained from an annual or a perennial plant. In some further embodiments, said lignin originates from a lignocellulosic biomass obtained, obtainable or derived from the group comprising or consisting of one or more of: cereal, wheat, wheat straw, rice, rice straw, corn, corn fiber, corn cobs, corn stover, hardwood bulk, softwood bulk, sugar cane, sweat sorghum, bagasse, nut shells, empty fruit bunches, grass, cotton seed hairs, barley, rye, oats, sorghum, brewer's spent grains, palm waste material, wood, soft lignocellulosic biomass, hard lignocellulosic biomass, and any combination thereof.

In some embodiments, said lignin comprises one or more impurities originating from its mode of production, such as enzyme residues, yeast residues, foam depressant(s), clean in place (CIP) compounds, salts and the like. In some further embodiments, said lignin comprises impurity/impurities originating from compounds native for the lignocellulosic material, such as cellulose residues, hemicellulose residues, monomeric sugar compounds, dimeric sugar compounds, oligomeric sugar compounds, carbohydrate residues, wax residues, minerals, ash, silica ($SiO_2$), silica comprising compositions, salts, organic acids, and the like, and any combination thereof. In some further embodiments, the purity of said lignin is 40% (w/w) or more, such as 42% (w/w) or more, for example 44% (w/w) or more, such as 46% (w/w) or more, e.g. 48% (w/w) or more, such as 50% (w/w) or more, such as 52% (w/w) or more, for example 54% (w/w) or more, such as 56% (w/w) or more, e.g. 58% (w/w) or more, such as 60% (w/w) or more, such as 62% (w/w) or more, for example 64% (w/w) or more, such as 66% (w/w) or more, e.g. 68% (w/w) or more, such as 70% (w/w) or more, such as 72% (w/w) or more, for example 74% (w/w) or more, such as 76% (w/w) or more, e.g. 78% (w/w) or more, such as 80% (w/w) or more. In yet some further embodiments, the purity of said lignin is 30-80, 40-75, 45-72, or 50-60% (w/w), and/or around 40, 45, 50, 55, 60, 65, 70, 75, or 80% (w/w). In some embodiments, said purity is determined based on content of Klason lignin or acid insoluble lignin. In yet some further embodiments, the corresponding percentage constituting impurities may be any one or more impurity as defined above.

In some embodiments, said lignin originates from a lignocellulosic biomass having been subjected to a hydrothermal pretreatment followed by a hydrolysis of at least part of the cellulose and at least part of the hemicellulose present in said lignocellulosic biomass. In some further embodiments, said lignin originates from a lignocellulosic biomass having been subject to a hydrothermal pretreatment followed by a hydrolysis of at least part of the cellulose and at least part of the hemicellulose present in said lignocellulosic biomass; and optionally followed by a fermentation, such as an alcohol fermentation. In yet some embodiments, said hydrolysis is an acid catalyzed hydrolysis, an enzymatic hydrolysis or any combination thereof.

In some embodiments, said lignin is obtained by pressing a fibrous fraction obtained after subjecting said lignocellulosic biomass to said hydrothermal pretreatment followed by said hydrolysis. In some further embodiments, said pressing of said fibrous fraction is preceded by rinsing and/or washing of said fibrous fraction. In yet some embodiments, said lignin is obtained by mechanically comminuting said pressed fibrous fraction to a desired extent, such as to around or at least 20, 25, 30, 35 or 40% dm (w/w).

In some embodiments, said lignin is obtained from soft lignocellulosic biomass, such as a biomass used or suitable for $2^{nd}$ generation bioethanol production, digestate or waste and optionally from a process comprising essentially no addition of acid or base during pretreatment.

In some embodiments, said composition is foaming at least 25, 20, 15, or 10% less under mixing when compared to a comparable composition comprising soda lignin, Kraft lignin, such as Indulin AT, organosolv lignin, or pure lignin instead. "Pure lignin" can e.g. be lignin with a Klason lignin content of e.g. more than 80, 90, 95% (w/w), or organosol lignin.

In some embodiments, said composition is requiring significantly less anti-foaming agent, such as at least 10, 20, 30, 40, 50, 60, 70, 80, or 90% less anti-foaming agent, or no anti-foaming agent, when compared to a comparable composition comprising soda lignin, Kraft lignin, such as Indulin AT, organosolv lignin, or pure lignin instead, while still providing comparable foaming characteristics during mixing.

In some embodiments, said composition requires significantly less plasticity modifying agent, such as at least 10, 20, 30, 40, 50, 60, 70, 80, or 90% less anti-foam plasticity modifying agent, when compared to a comparable composition comprising soda lignin, Kraft lignin, such as Indulin AT, organosolv lignin, or pure lignin instead, while still providing comparable characteristics such as one or more quality parameters, such as e.g. one or more of: penetration, softening point, rheology, cohesion, adhesion and durability, e.g. as disclosed in SHB #6, Chapter 5, in particular Chapters 5.5.1-5.5.4.

In some embodiments, said composition comprises significantly more non-bitumen derived carbon, such as at least 10, 20, 30, 40, 50% or more non-bitumen derived carbon when compared to a comparable composition comprising soda lignin, Kraft lignin, such as Indulin AT, organosolv lignin, or pure lignin instead, while still providing comparable characteristics such as one or more quality parameters, such as e.g. one or more of: penetration, softening point, rheology, cohesion, adhesion and durability, e.g. as disclosed in SHB #6, Chapter 5, in particular Chapters 5.5.1-5.5.4.

In some embodiments, said composition shows one or more of: (i) a significant reduction in oxidation, e.g. under mixing and/or exposure of a surface to air and/or oxygen; (ii) a significant increase in UV resistance, and/or (iii) a significant increase longevity, wherein said significant reduction or increase is at least in the order of 10, 20, 30, 40 or 50%, when compared to a comparable composition comprising soda lignin, Kraft lignin, such as Indulin AT, organosolv lignin, or pure lignin instead.

For the avoidance of doubt, in the context of the present invention, the term "comparable composition" is meant to comprise a composition, such as a reference composition, comprising e.g. a different kind of lignin (e.g. Kraft lignin, Indulin AT, soda lignin, pure lignin or organosolv lignin) instead of the lignin composition according to the first aspect of the invention. Such a reference composition would e.g. contain or comprise the same amount lignin per weight as the composition it is compared to, and preferably having comparable dry matter content, e.g. being dried using the same method and equipment(s), and being processed and mixed in a similar manner, if applicable. Obviously, the different lignins used may comprise different percentages of impurities, which are usually ignored; thus, the compositions to be compared may comprise different percentages of e.g. Klason lignin.

In a third aspect, the present invention relates to the use of a composition according to the first, fourth or ninth aspect in one or more of: sealing work, road work, paving work, providing a surface layer, providing a sealing layer, providing a road and providing a pavement, providing a top layer of a road. Such uses may comprise applications relating to (i) agriculture, (ii) buildings and industrial paving, (iii) hydraulics and erosion control, (iv) industrial, (v) paving, (vi) railways, and (vii) recreation.

In some embodiments, said use comprises applications relating to (i) agriculture, (ii) buildings and industrial paving, (iii) hydraulics and erosion control, (iv) industrial, (v) paving, (vi) railways, and (vii) recreation, such as ad (i) disinfectants, fence post coating, mulches, mulching paper, paved barn floors, barnyards, feed platforms, protecting tanks, vats, protection for concrete structures, tree paints (protective); ad (ii): water and moisture barriers (above and below ground), floor compositions, tiles, coverings, insulating fabrics, papers, step treads, building papers, caulking compounds, cement waterproofing compounds, glass wool compositions, insulating fabrics, felts, papers, joint filler compounds, laminated roofing shingles, liquid roof coatings, plastic cements, shingles, acoustical blocks, compositions, felts, bricks, damp-proofing coatings, compositions, insulating board, fabrics, felts, paper, masonry coatings, plasterboards, putty, soundproofing, stucco base, wallboard, air-drying paints, varnishes, artificial timber, ebonised timber, insulating paints, plumbing, pipes, treated awnings, canal linings, sealants; ad (iii): catchment areas, basins, dam groutings, dam linings, protection, dyke protection, ditch linings, drainage gutters, structures, embankment protection, groynes, jetties, levee protection, mattresses for levee and bank protection, membrane linings, waterproofing, reservoir linings, revetments, sand dune stabilisation, sewage lagoons, oxidation ponds, swimming pools, waste ponds, water barriers, backed felts, ad (iv): conduit insulation, lamination, insulating boards, paint compositions, papers, pipe wrapping, insulating felts, panel boards, underseal, battery boxes, carbons, electrical insulating compounds, papers, tapes, wire coatings, junction box compound, moulded conduits, black grease, buffing compounds, cable splicing compound, embalming, etching compositions, extenders, explosives, lap cement, plasticisers, preservatives, printing inks, well drilling fluid, armoured bituminised fabrics, burlap impregnation, mildew prevention, sawdust, cork, asphalt composition, acid-proof enamels, mastics, varnishes, acid-resistant coatings, air-drying paints, varnishes, anti-corrosive and anti-fouling paints, anti-oxidants and solvents, base for solvent compositions, baking and heat-resistant enamels, boat deck sealing compound, lacquers, japans, marine enamels, blasting fuses, briquette binders, burial vaults, casting moulds, clay articles, clay pigeons, expansion joints, flowerpots, foundry cores, friction tape, gaskets, mirror backing, rubber, moulded compositions, shoe fillers, soles; ad (v): airport runways, taxiways, aprons, asphalt blocks, brick fillers, bridge deck, surfacing, crack fillers, floors for buildings, warehouses, garages, highways, roads, streets, shoulders, kerbs, gutters, drainage ditches, parking lots, driveways, Portland cement concrete underseal, roof-deck parking, pavements, footpaths, soil stabilisation; ad (vi) ballast treatment, dust laying, paved ballast, sub-ballast, paved crossings, freight yards, station platforms; and ad (vii) dance pavilions, drive-in movies, gymnasiums, sport arenas, playgrounds, school yards, race tracks, running tracks, skating rinks, swimming and wading pools, tennis courts, handball courts, synthetic playing fields and running track surfaces.

In a fourth aspect, the present invention concerns a sealing layer comprising a composition according to the first or second aspect of the invention. Such a sealing layer may be comprised in e.g. a roof, dam, pool, pond, lake, roof, bridge, tunnel, road, or the like.

In some embodiments, said sealing layer may comprise e.g. 5-15, or 7-10% bitumen. Such layers may require heating e.g. mastic asphalt to a temperature of 210° C., which is spread in one or more layers to form an impervious barrier of e.g. 20 mm.

In a fifth aspect, the present invention relates to an asphalt composition comprising a composition according to the first or ninth aspect of the invention. Such asphalt compositions comprise mineral aggregates and/or fillers, and may comprise mastic asphalt or rolled asphalt.

In some embodiments, the present invention concerns a road and/or pavement comprising a composition according to the first, second or fifth aspect. Such roads usually comprise a surface layer and optionally one or more further layers, such as a binder layer, a base layer, and/or a sub base layer. Any of said layers may comprise a composition according to the first, fourth or ninth aspect of the invention.

In some embodiments, said road and/or pavement comprises a surface layer and optionally one or more further layers. In some further embodiments, said one or more further layer is a binder layer, a base layer, and/or a sub base layer. In yet a further embodiment, said surface layer comprises a composition according to the first, second, fourth or fifth aspect. In still a further embodiment, said one or more further layer comprises a composition according to the first, fourth or ninth aspect.

In some embodiments, the present invention concerns construction work comprising the provision and/or use of a composition according to the first, second, fourth or fifth aspect of the invention, as well as uses according to the third aspect of the invention.

In some embodiments, said construction work is road work and/or sealing work.

In other embodiments, the present invention pertains to a process for providing a composition according to the first, second, fourth or fifth aspect of the invention, said process comprising the steps of mixing said bitumen, said one or more plasticity modifying agent(s), said lignin, and said optionally one or more further component(s). Said mixing may at least in part be conducted at a temperature between 140 and 220, 160-200, or 170-180° C.

In an sixth aspect, the present invention concerns a process for obtaining a bitumen composition, said process comprising:
a) subjecting said lignocellulosic biomass for hydrothermal pretreatment resulting in a hydrothermally pretreated lignocellulosic biomass; followed by
b) subjecting at least part of said hydrothermally pretreated lignocellulosic biomass obtained in step (a) to a hydrolysis resulting in a liquid fraction comprising soluble carbohydrates, and a fiber fraction comprising a lignin component, wherein said hydrolysis is an acid catalyzed hydrolysis and/or enzymatic hydrolysis; followed by
c) optionally subjecting at least part of the liquid fraction obtained in step (b) to a fermentation in order to ferment at least part of said soluble carbohydrates to a fermentation product, such as ethanol, methane or butanol, thereby obtaining a fermentation broth;
d) optionally isolating at least part of said fermentation product from the fermentation broth obtained in step (c) e.g. by distillation;
e) isolating at least part of the lignin from one or more of: the fiber fraction obtained in step (b); the fermentation broth obtained in step (c); or after isolation of at least a part of the fermentation product in step (d);
f) converting at least part of the lignin component obtained in step (e) to a bitumen composition by admixing said lignin component with bitumen and a plasticity modifying agent(s).

In one embodiment the bitumen composition obtained in step f) is a composition according to any one of the previous aspects. In one embodiment, the present invention concerns a process for obtaining a bitumen composition, said process comprising:
a) subjecting lignocellulosic biomass to hydrothermal pretreatment at a pH within the range of 3.5 to 9.0, at a temperature between 150 and 260° C., preferably 150-200° C., for a residence time of less than 60 minutes resulting in a hydrothermally pretreated lignocellulosic biomass; followed by
b) subjecting at least part of said hydrothermally pretreated lignocellulosic biomass obtained in step (a) to a hydrolysis resulting at a temperature between 30 and 72° C. for period between 24 and 150 hours in a liquid fraction comprising soluble carbohydrates, and a fiber fraction comprising a lignin component, wherein said hydrolysis is an acid catalyzed hydrolysis and/or enzymatic hydrolysis; followed by
c) optionally subjecting at least part of the liquid fraction obtained in step (b) to a fermentation in order to ferment at least part of said soluble carbohydrates to a fermentation product, such as ethanol, methane or butanol, thereby obtaining a fermentation broth.

In some embodiments, said at least part of said lignin fraction is isolated from the fiber fraction obtained in step (b).

In some embodiments, said at least part of said lignin fraction is isolated from said fermentation broth obtained in step (c).

In some embodiments, said hydrothermal pretreatment of said lignocellulosic biomass is performed at a temperature of 150-260° C., such as 160-250° C., 150-200° C., or e.g. 170-240° C., such as 180-230° C., for example 190-220° C., such as 200-210° C. In a preferred embodiment, the hydrothermal pretreatment is performed at a temperature of 150-220° C., preferably 150-200° C., more preferred 175-200° C., most preferred 180-200° C.

In some embodiments, said hydrothermal pretreatment of said lignocellulosic biomass is performed in a period of residence time of 2-120 minutes (min.), such as 5-110 min., e.g. 10-100 min., for example 15-90 min., such as 20-80 min., such as 25-70 min., e.g. 30-60 min, such as 35-50 min, such as 40-45 min. In a preferred embodiment, said hydrothermal pretreatment of said lignocellulosic biomass is performed in a period of residence time of 10-60 min., preferably 10-45 min., more preferred 10-30 min., most preferred 15-25 minutes.

In some embodiments, soaking/wetting with an aqueous solution can serve to adjust pH prior to pretreatment to the range of between 3.5 and 9.0, which is typically advantageous for autohydrolysis. It will be readily understood that pH may change during pretreatment, typically to more acidic levels as acetic acid is liberated from solubilized hemicellulose. Further suitable pH values may be disclosed elsewhere herein.

Suitable hydrothermal pretreatment reactors typically include most pulping reactors known from the pulp and paper industry. In some embodiments, hydrothermal pretreatment is administered by steam within a reactor pressurized to 10 bar or lower, or to 12 bar or lower, or to 4 bar or higher, or 8 bar or higher, or between 8 and 18 bar, or between 18 and 20 bar. In some embodiments, the pretreatment reactor is configured for a continuous inflow of feedstock.

In some embodiments, said hydrothermal pretreatment of said lignocellulosic biomass is performed by subjecting said lignocellulosic biomass to a log severity, log(Ro) of 2.5 or more, such as a log(Ro) of 2.6 or more, e.g. a log(Ro) of 2.7 or more, such as a log(Ro) of 2.8 or more, for example a log(Ro) of 2.9 or more, such as a log(Ro) of 3.0 or more, such as a log(Ro) of 3.1 or more, for example a log(Ro) of 3.2 or more, e.g. a log(Ro) of 3.3 or more, such as a log(Ro) of 3.4 or more, such as a log(Ro) of 3.5 or more; such as a log(Ro) of 3.6 or more; for example such as a log(Ro) of 3.7 or more, e.g. a log(Ro) of 3.8 or more, for example a log(Ro) of 3.9 or more, for example a log(Ro) of 4.0 or more, such as a log(Ro) of 4.1 or more, or a log(Ro) of 4.2 or more; wherein the log severity is defined as: $\log(Ro)=(\text{residence time})\times(\exp[\text{Temperature}-100/14.75])$. In some further embodiments, said hydrothermal pretreatment of said lignocellulosic biomass results in a xylan number of: 5% or more, 6% or more, 7% or more, 8% or more, 9% or more, 10% or more. The xylan number may be in the range of 5-20%, 5-15%, 5-12.5%, 5-10%. In an alternative, the xylan number may be in the range of 8-20, 8-15 or 8-12.5%.

In some embodiments, said hydrolysis comprises the action of one or more cellulase(s). In some further embodiments, said one or more cellulases are selected from the group comprising exo-glucanases, endo-glucanases, hemicellulases and beta-glucosidases.

In some embodiments, said hydrolysis is performed for a period of time of 1-200 hours, such as 5-190 hours, such as 10-185 hours, e.g. 15-180 hours, for example 20-175 hours, such as 25-170 hours, such as 30-165 hours, e.g. 35-160 hours, for example 40-155 hours, such as 45-150 hours, such as 50-145 hours, e.g. 55-140 hours, for example 60-135 hours, such as 65-130 hours, such as 70-125 hours, e.g. 75-120 hours, for example 80-115 hours, such as 85-110 hours, such as 90-105 hours, e.g. 95-100 hours.

In some embodiments, said step (b) and step (c) are performed as a separate hydrolysis and fermentation step (SHF), and wherein said hydrolysis is performed at a temperature of 30-72° C., such as 32-70° C., e.g. 34-68° C., for example 36-66° C., such as 38-64° C., e.g. 40-62° C., 42-60° C., e.g. 44-58° C., for example 46-56° C., such as 48-54° C., e.g. 50-52° C.

In some embodiments, said hydrolysis is performed in a period of time of 70-125 hours, e.g. 75-120 hours, for example 80-115 hours, such as 85-110 hours, such as 90-105 hours, e.g. 95-100 hours.

In some embodiments, said step (b) and step (c) are performed as a simultaneous saccharification and fermentation step (SSF), and wherein said hydrolysis is performed at a temperature of 30-72° C., such as 32-70° C., e.g. 34-68° C., for example 36-66° C., such as 38-64° C., e.g. 40-62° C., 42-60° C., e.g. 44-58° C., for example 46-56° C., such as 48-54° C., e.g. 50-52° C.

In some embodiments, said hydrolysis is performed in a period of time of 1-12 hours, such as 2-11 hours, for example 3-10 hours, such as 4-9 hours, e.g. 5-8 hours, such as 6-7 hours.

In some embodiments, said step (b) and step (c) are performed as a simultaneous saccharification and fermentation step (SSF), and wherein said fermentation is performed at a temperature of 25-40° C., such as 26-39° C., e.g. 27-38° C., for example 28-37° C., e.g. 29-36° C., for example 30-35° C., such as 31-34° C. or 32-33° C.

In some embodiments, said fermentation is performed in a period of time of 100-200 hours, such as 105-190 hours, such as 110-185 hours, e.g. 115-180 hours, for example 120-175 hours, such as 125-170 hours, such as 130-165 hours, e.g. 135-160 hours, for example 140-155 hours, such as 145-150 hours.

In some embodiments, said process for treatment of a lignocellulosic biomass comprises a "C5 bypass", i.e. comprises a solid/liquid separation step before step (b), wherein the liquid fraction is not subjected to said hydrolysis in step (b).

In some embodiments, said process comprises a two (or more) step treatment, and optionally, wherein a liquid fraction is collected after a first pretreatment step, e.g. by pressing.

In some embodiments, said process is conducted as "whole slurry" process, i.e. wherein the pretreated biomass is subjected directly in a subsequent hydrolysis step, such as an enzymatic hydrolysis and/or fermentation.

In some embodiments, said lignin is obtained from soft lignocellulosic biomass, such as a biomass used or suitable for $2^{nd}$ generation bioethanol production, digestate or waste, and optionally from a process comprising essentially no addition of acid or base during pretreatment.

The present invention is further described by the following numbered embodiments:

1. A composition comprising bitumen, one or more plasticity modifying agent(s), lignin, and optionally one or more further component(s); wherein said lignin has a Lignin Ion Exchange Capacity (LIEC) of 0.4 mol/kg dry matter (DM) or less and/or wherein the phenolic OH (phOH) content is less than 2 mmol/g.
2. A composition according to embodiment 1, wherein the bitumen is straight run bitumen, hard bitumen, oxidised bitumen, cut-back bitumen or fluxed bitumen.
3. A composition according to embodiment 1 or 2, said further component(s) being one or more aggregate(s) and/or filler(s), such as natural, manufactured, recycled aggregates, including any combination thereof.
4. A composition according to embodiment 3, said aggregate being one or more of coarse aggregate, fine aggregate, all-in aggregate, and filler aggregate.
5. A composition according to embodiment 3 or 4, wherein the aggregate or filler comprises igneous, sedimentary, and/or metamorphic rock, such as Granite, Syenite, Granodiorite, Diorite, Gabbro, Dolerite, Diabase, Rhyolite, Trachyte, Andesite, Dacite, Basalt; Sandstone, Gritstone, Conglomerate, Breccia, Arkose, Greywacke, Quartzite (ortho), Shale, Siltstone, Limestone, Chalk, Dolomite, Chert, Flint, and Amphibolites, Gneiss, Granulite, Hornfels, Marble, Quartzite (meta), Serpentinite, Schist, Slate; including any combination thereof.
6. A composition according to any one of the preceding embodiments, said further component(s) being one or more active component.
7. A composition according to any one of the preceding embodiments comprising or consisting of:
   a. 1-99.89% (w/w) bitumen;
   b. 0.01-20% (w/w) plasticity modifying agent(s);
   c. 0.1-50% (w/w) lignin; and
   d. 0-95% (w/w) further component(s).
8. A composition according to any one of the preceding embodiments comprising
   a. 25-99.89% (w/w) bitumen;
   b. 0.01-20% (w/w) plasticity modifying agent(s); and
   c. 0.1-50% (w/w) lignin;
   wherein the w/w of (a), (b) and/or (c) is calculated as weight per total weight of the sum of bitumen (a), plasticity modifying agents (b) and lignin (c).
9. A composition according to any one of the preceding embodiments comprising 25-99.89, 60-94, or 74-86% (w/w) bitumen.
10. A composition according to any one of the preceding embodiments comprising 0.01-20, 1-10, or 4-6% (w/w) plasticity modifying agent(s).
11. A composition according to any one of the preceding embodiments comprising; 0.1-50, 5-30, or 10-20% (w/w) lignin.

12. A composition according to any one of the preceding embodiments, comprising 0-99% (w/w) further component(s).
13. A composition according to any one of the preceding embodiments, comprising 0-20, 0.1-15, 1-10, or 2-5% (w/w) active component.
14. A composition according to any one of the preceding embodiments, comprising 0-99, or 0-98, 0-97, 0-96, 0-95, 0-94, 0-93, 0-92, 0-91, 0-90, 80-98, 85-97, 90-95% (w/w) aggregate and/or filler.
15. A composition according to any one of the preceding embodiments, said composition being suitable for road construction, sealing work or the like.
16. A composition according to any one of the preceding embodiments, wherein said (i) bitumen; (ii) the bitumen and the plasticity modifying agent (i.e. the polymer-modified bitumen (PMB); (iii) the bitumen comprising lignin; the PMB and lignin; or said composition has one or more characteristics as specified in EN 12591, EN 13924, EN 14023, IS 73:2006, ASTM D946-09, ASTM D3381-09 and M 226-80, EN 12591:2009a (BSI, 2009a), EN 13924:2006 (BSI, 2006), EN 14023:2010 (BSI, 2010a), EN 13304:2009 (BSI, 2009b), EN 13305:2009 (BSI, 2009c), EN 15322:201 3 (BSI, 2013), EN 14023: 2010 (BSI, 2010a), EN 14771:2012 (BSI, 2012a), EN 14770:2012 (BSI, 2012b), EN 13589:2008 (BSI, 2008), EN 13703:2003 (BSI, 2003), EN 13587:2010 (BSI, 2010b), or EN 13398:2010 (BSI, 2010c).
17. A composition according to any one of the preceding embodiments, wherein said bitumen, PMB, bitumen comprising lignin, the PMB comprising lignin, or said composition is of grade 20/30, 30/45, 35/50, 40/60, 50/70, 70/100, 100/150, 160/220, 250/330, or 330/430.
18. A composition according to any one of the preceding embodiments, wherein said one or more plasticity modifying agent is one or more plastomer, one or more thermoplastic elastomer, one or more rubber, one or more viscosity modifier, and/or one or more reactive polymer, including any combination thereof.
19. A composition according to any one of the preceding embodiments, wherein said plastomers is e.g. one or more of ethylene-vinyl acetate (EVA), ethylene-methyl acrylate (EMA), ethylene-butyl acrylate (EBA), atactic polypropylene (APP), polyethylene (PE), polypropylene (PP), polyvinyl chloride (PVC), and polystyrene (PS).
20. A composition according to any one of the preceding embodiments, wherein said one or more plastomer is selected from one or more of: EVA, EMA, EBA, APP, PE, PP, PVC, and PS, including any combination thereof.
21. A composition according to any one of the preceding embodiments, wherein said thermoplastic elastomers is e.g. one or more of butadiene elastomer (SBE), linear or radial styrene-butadiene-styrene elastomer (SBS), styrene-butadiene rubber (SBR), styrene-isoprene-styrene elastomer (SIS), styrene-ethylene-butadiene-styrene elastomer (SEBS), ethylene-propylene-diene terpolymer (EPDM), isobutene-isoprene random copolymer (IIR), polyisobutene (PIB), polybutadiene (PBD), polyisoprene (PI).
22. A composition according to any one of the preceding embodiments, wherein said one or more thermoplastic elastomers is selected from one or more of: SBE, SBS; SBR, SIS, EBS, EPDM, IIR, PIB, PBD, and PI, including any combination thereof.
23. A composition according to any one of the preceding embodiments, wherein said rubber is a natural rubber, such as latex, or a synthetic rubber, such as recycled tire rubber or recycled crumb rubber.
24. A composition according to any one of the preceding embodiments, wherein said viscosity modifier is one or more flux oil (aromatics, napthenics, parrafinics), or Fischer-Tropsch waxes, including any combination thereof.
25. A composition according to any one of the preceding embodiments, wherein said reactive polymer is one or more random terpolymer of ethylene, acrylic ester and glycidyl methacrylate, or maleic anhydride-grafted styrene-butadiene-styrene copolymer, including any combination thereof.
26. A composition according to any one of the preceding embodiments, wherein said active component is selected from the group comprising or consisting of one or more dispersing agent(s), surfactant(s), hydrotropic agent(s), emulsifier(s), preserving agent(s), anti-foaming agent (s), viscosity modifier(s), reactive polymer(s) and any combination thereof.
27. A composition according to any one of the preceding embodiments, wherein said one or more further component or active component is present in the range of 0.001% to 5% (w/w).
28. A composition according to any one of the preceding embodiments, wherein the bitumen, the one or more plasticity modifying agent(s), the lignin, and the optional one or more further component and/or active agent are in a state of being intermixed.
29. A composition according to embodiment 28, wherein the state of being intermixed is selected from the group comprising or consisting of being intermixed as a solution; being intermixed as a suspension; being intermixed as an emulsion; being intermixed as a dispersion; being intermixed as a slurry; and any combination thereof.
30. A composition according to any one of embodiments 26 to 29, wherein said one or more dispersing agent is selected from the group comprising or consisting of non-ionic, anionic, cationic and amphoteric dispersing agent(s) and any combination and/or compatible mixture thereof.
31. A composition according to any one of embodiments 26 to 30, wherein said one or more dispersing agent is present in said composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).
32. A composition according to any one of embodiments 26 to 31, wherein said one or more surfactant is selected from the group comprising or consisting of anionic, cationic, zwitterionic and nonionic surfactants, and any combination and/or compatible mixture thereof.
33. A composition according to any one of embodiments 26 to 32, wherein said one or more surfactant is present in said composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).

34. A composition according to any one of embodiments 26 to 33, wherein said one or more hydrotropic agent is selected from the group comprising or consisting of: non-ionic, anionic, cationic and amphoteric hydrotropes and any combination and/or compatible mixtures thereof.

35. A composition according to any one of embodiments 26 to 34, wherein said one or more hydrotropic agent is present in said composition in an amount of 10-50,000 ppm or 200-40,000 ppm, such as 300-30,000 ppm, e.g. 400-20,000 ppm, for example 500-15,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).

36. A composition according to any one of embodiments 26 to 35, wherein said one or more emulsifier is selected from the group comprising or consisting of sodium phosphate(s), sodium stearoyl lactylate cationic, lecithin, DATEM (diacetyl tartaric acid ester of monoglyceride), and any combination and/or compatible mixture thereof.

37. A composition according to any one of embodiments 26 to 36, wherein said one or more emulsifier is present in said composition in an amount of 10-50,000 ppm or 200-20,000 ppm, such as 300-18,000 ppm, e.g. 400-16,000 ppm, for example 500-14,000 ppm, such as 600-12,000 ppm, 700-10,000 ppm, for example 800-8,000 ppm, such as 900-7,000 ppm, e.g. 1,000-6,000 ppm, 1,200-5,000 ppm, such as 1,400-5,000 ppm, e.g. 1,600-4,000 ppm, 1,800-3,000 ppm, such as 2,000-2,800 ppm, for example 2,200-2,600 ppm (w/w) in relation to said composition, either including or excluding said optional aggregate(s) and/or optional filler(s).

38. A composition according to any one of embodiments 26 to 37, wherein said one or more preserving agent is selected from the group comprising or consisting of one or more carboxylate, benzoate, benzoic acid derivative such as parabene(s), aldehyde(s), thiazine(s), organic acid(s) and the like, and any combination thereof.

39. A composition according to any one of embodiments 26 to 38, wherein said one or more preserving agent is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

40. A composition according to any one of embodiments 26 to 39, wherein said one or more anti-foaming agent is selected from the group comprising or consisting of active silicone polymer(s), siloxane polymer(s), organo-modified siloxane(s), non-silicone compound(s)/composition(s) comprising polypropylene-based polyether dispersions, fatty acid-type antifoam, non-ionic emulsifier, and any combination thereof.

41. A composition according to any one of embodiments 26 to 40, wherein said one or more anti-foaming agent is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

42. A composition according to any one of embodiments 26 to 41, wherein said one or more viscosity modifier is selected from the group comprising or consisting of one or more flux oil, such as aromatics, napthenics, parrafinics, or any combination of said aromatics, napthenics, parrafinics, Fischer-Tropsch waxes, and any combination thereof.

43. A composition according to any one of embodiments 26 to 42, wherein said one or more viscosity modifier is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

44. A composition according to any one of embodiments 26 to 43, wherein said one or more reactive polymer(s) is selected from the group comprising or consisting of one or more of: random terpolymer of ethylene, acrylic ester and glycidyl methacrylate, and maleic anhydride-grafted styrene-butadiene-styrene copolymer, and any combination thereof.

45. A composition according to any one of embodiments 26 to 44, wherein said one or more reactive polymer is present in said composition in an amount of 10-50,000 ppm or 20-10,000 ppm, such as 30-8,000 ppm, e.g. 40-6,000 ppm, for example 50-5,000 ppm, such as 60-4,000 ppm, 70-3,000 ppm, for example 80-2,000 ppm, such as 90-1,500 ppm, e.g. 100-1,200 ppm, 120-1,000 ppm, such as 140-800 ppm, e.g. 160-600 ppm, 180-400 ppm, such as 200-300 ppm, for example 2,200-250 ppm (w/w) in relation to said composition, either including or excluding said optional aggregate(s) and/or optional filler(s).

46. A composition according to any one of the preceding embodiments, said lignin being a lignin-rich fraction obtained or obtainable from a process comprising the steps of (i) pretreating plant biomass and (ii) enzymatic hydrolysis of at least a fraction of the pretreated biomass from step (i), such as a $2^{nd}$ generation bioethanol production.

47. A composition according any one of the preceding embodiments, wherein said lignin is not lignin from paper and pulp production, such as Kraft lignin, wherein said Kraft lignin being provided from biomass by a process known in the art as Kraft process/method.

48. A composition according to any one of the preceding embodiments, wherein said lignin is not Kraft lignin, lignosulfonate, or soda lignin.

49. A composition according any one of the preceding embodiments, wherein said lignin has not been provided by a Kraft method or another method comprising an alkaline treatment, such as by addition of NaOH or another base to provide a pH of around 10 or higher, at or around pH 11 or higher, or at or around pH 12 or higher.

50. A composition according to any one of the preceding embodiments, wherein said lignin has not been esterified and/or subjected to an esterification step, such as disclosed in WO2015/094098.
51. A composition according to any one of the preceding embodiments, wherein said lignin has a Lignin Ion Exchange Capacity (LIEC) of 0.4 mol/kg dry matter (DM) or less, 0.3 mol/kg dry matter (DM) or less, such as 0.25 mol/kg DM or less, such as 0.20 mol/kg DM or less, such as 0.15 mol/kg DM or less, or such as 0.10 mol/kg DM or less.
52. A composition according to any one of the preceding embodiments, wherein said lignin has a LIEC in the range of 0.05-0.40, 0.10-0.30, or 0.10-0.20 mol/kg DM.
53. A composition according to any one of the preceding embodiments, wherein the Lignin Ion Exchange Capacity is around 0.40, 0.35, 0.30, 0.25, 0.20, 0.15, 0.10, mol/kg dry matter or less; in the range of 0.10-0.20, 0.20-0.30, 0.30-0.40 mol/kg dry matter; and/or in the range of 0.05-0.40, 0.10-0.30, or 0.10-0.20 mol/kg DM.
54. A composition according to any one of the preceding embodiments, wherein said lignin is significantly less polar than Kraft lignin, such as assessed by LIEC measurement, such as having a LIEC at least 0.10, 0.11, 0.12, 0.13, 0.14, 0.15, 0.16, or 0.17 mol/kg DM lower than the LIEC of Kraft lignin.
55. A composition according to any one of the preceding embodiments, wherein said lignin is significantly less hygroscopic, such as binding at least 20, 25, 30, 35, 40, 45, 50, 55, 60, 65, 70, 75, 80, 85, 90, 95 or 100% (w/w) less water when compared to Kraft lignin.
56. A composition according to any one of the preceding embodiments, wherein said lignin is swelling significantly less than Kraft lignin, such as swelling at least 20, 25, 30, 35, 40, 45, 50, 55, 60, 65, 70, 75, 80, 85, 90, 95 or 100% less, and optionally wherein said swelling is determined as change in particle size upon suspension in water or another suitable medium after 60 min.
57. A composition according to any one of the preceding embodiments, wherein said lignin comprises cellulose in an amount of 2,000-300,000 ppm, such as 3,000-180,000 ppm, e.g. 4,000-160,000 ppm, for example 5,000-140,000 ppm, such as 6,000-120,000 ppm, 7,000-100,000 ppm, for example 8,000-80,000 ppm, such as 9,000-70,000 ppm, e.g. 10,000-60,000 ppm, 12,000-50,000 ppm, such as 14,000-50,000 ppm, e.g. 16,000-40,000 ppm, 18,000-30,000 ppm, such as 20,000-28,000 ppm, for example 22,000-26,000 ppm (w/w).
58. A composition according to any one of the preceding embodiments, wherein said lignin comprises hemicellulose in an amount of 2,000-200,000 ppm, such as 3,000-180,000 ppm, e.g. 4,000-160,000 ppm, for example 5,000-140,000 ppm, such as 6,000-120,000 ppm, 7,000-100,000 ppm, for example 8,000-80,000 ppm, such as 9,000-70,000 ppm, e.g. 10,000-60,000 ppm, 12,000-50,000 ppm, such as 14,000-50,000 ppm, e.g. 16,000-40,000 ppm, 18,000-30,000 ppm, such as 20,000-28,000 ppm, for example 22,000-26,000 ppm (w/w).
59. A composition according to any one of the preceding embodiments, wherein said lignin comprises ash in an amount of 2,000-200,000 ppm, such as 3,000-180,000 ppm, e.g. 4,000-160,000 ppm, for example 5,000-140,000 ppm, such as 6,000-120,000 ppm, 7,000-100,000 ppm, for example 8,000-80,000 ppm, such as 9,000-70,000 ppm, e.g. 10,000-60,000 ppm, 12,000-50,000 ppm, such as 14,000-50,000 ppm, e.g. 16,000-40,000 ppm, 18,000-30,000 ppm, such as 20,000-28,000 ppm, for example 22,000-26,000 ppm (w/w).
60. A composition according to any one of the preceding embodiments, wherein the lignin has a dry matter (dm) of at least 80% (w/w) or more, such as at least 85% (w/w), such as at least 90% (w/w), such as at least 92.5% (w/w), such as at least 95% (w/w), such as at least 96% (w/w), such as at least 97% (w/w), such as at least 98% (w/w), or such as at least 99% (w/w).
61. A composition according to any one of the preceding embodiments, wherein the dry matter content of said lignin is 1.0-99% (w/w), 10-99% (w/w) or 20-95% (w/w), such as 21-94% (w/w), e.g. 22-93% (w/w), such as 23-92% (w/w), such as 24-91% (w/w), for example 25-90% (w/w), such as 26-89% (w/w), such as 27-88% (w/w), for example 28-87% (w/w), e.g. 29-86% (w/w), such as 30-85% (w/w), such as 31-84% (w/w), such as 32-83% (w/w), such as 33-82% (w/w), for example 34-81% (w/w), such as 35-80% (w/w).
62. A composition according to any one of the preceding embodiments, wherein the lignin is in the form of pellets, granulate, powder, dried filter cake, or dried decanter cake.
63. A composition according to any one of the preceding embodiments, wherein said lignin is having an average grain size of 1-2000 µm, 1-1500 µm, 1-1200 µm, 1-1000 µm, 1-800 µm, 1-600 µm, 1-500 µm, 1-450 µm, such as 1.5-430 µm, e.g. 2-420 µm, such as 3-410 µm, for example 4-400 µm, e.g. 5-390 µm, such as 6-380 µm, e.g. 7-370 µm, such a 8-360 µm, 9-350 µm, for example 10-340 µm, e.g. 12-330 µm, such as 14-320 µm, such as 16-310 µm, for example 18-300 µm, e.g. 20-290 µm, such as 22-280 µm, e.g. 25-270 µm, such a 30-260 µm, 35-250 µm, for example 40-240 µm, e.g. 45-230 µm, such as 50-220 µm, for example 60-210 µm, for example 70-200 µm, e.g. 80-190, for example 90-180 µm, e.g. 100-170 µm, such a 110-160 µm, 120-150 µm, for example 130-140 µm.
64. A composition according to embodiment 63, wherein said average grain or particle size is determined before or after providing said composition, and optionally, wherein said grain or particle size being measured by laser diffraction spectroscopy, or e.g. by a Malvern Mastersizer.
65. A composition according to any one of the preceding embodiments, wherein said lignin is having an average molecular weight (Da) of 1,000 or above, 1,500 or above, 2,000 or above, 2,500 or above, 3,000 or above, such as 3,500 or above, e.g. 4,000 or above, such as 5,000 or above, for example 5,500 or above, such as 6,000 or above, e.g. 7,000 or above, for example 8,000 or above, such as 9,000 or above, for example 10,000 or above, such as 12,000 or above, e.g. 14,000 or above, for example 16,000 or above, e.g. 18,000 or above, e.g. 20,000 or above, such as 25,000 or above, e.g. 30,000 or above, such as 35,000 or above, for example 40,000 or above, such as 45,000 or above, e.g. 50,000 or above, such as 55,000 or above, e.g. 60,000 or above, such as 65,000 or above, e.g. 70,000 or above, such as 75,000 or above, for example 80,000 or above, such as 85,000 or above, e.g. 90,000 or above, such as 95,000 or above, or 100,000 or above.
66. A composition according to any one of the preceding embodiments, wherein said lignin originates from a lignocellulosic biomass obtained from an annual or a perennial plant.
67. A composition according to any one of the preceding embodiments, wherein said lignin originates from a lignocellulosic biomass obtained, obtainable or derived from the group comprising or consisting of one or more of: cereal, wheat, wheat straw, rice, rice straw, corn, corn fiber, corn cobs, corn stover, hardwood bulk, softwood bulk, sugar cane, sweat sorghum, bagasse, nut shells, empty fruit bunches, grass, cotton seed hairs, barley, rye, oats, sorghum, brewer's spent grains, palm waste material, wood, soft lignocellulosic biomass, hard lignocellulosic biomass, and any combination thereof.
68. A composition according to any one of the preceding embodiments, wherein said lignin comprises one or more impurities originating from its mode of production, such as enzyme residues, yeast residues, foam depressant(s), clean in place (CIP) compounds, salts and the like.
69. A composition according to any one of the preceding embodiments, wherein said lignin comprises impurity/impurities originating from compounds native for the lignocellulosic material, such as cellulose residues, hemicellulose residues, monomeric sugar compounds, dimeric sugar compounds, oligomeric sugar compounds, carbohydrate residues, wax residues, minerals, ash, silica (SiO2), silica comprising compositions, salts, organic acids, and the like, and any combination thereof.
70. A composition according to any one of the preceding embodiments, wherein the purity of said lignin is 40% (w/w) or more, such as 42% (w/w) or more, for example 44% (w/w) or more, such as 46% (w/w) or more, e.g. 48% (w/w) or more, such as 50% (w/w) or more, such as 52% (w/w) or more, for example 54% (w/w) or more, such as 56% (w/w) or more, e.g. 58% (w/w) or more, such as 60% (w/w) or more, such as 62% (w/w) or more, for example 64% (w/w) or more, such as 66% (w/w) or more, e.g. 68% (w/w) or more, such as 70% (w/w) or more, such as 72% (w/w) or more, for example 74% (w/w) or more, such as 76% (w/w) or more, e.g. 78% (w/w) or more, such as 80% (w/w) or more.
71. A composition according to any one of the preceding embodiments, wherein the purity of said lignin is 30-80, 40-75, 45-72, or 50-60% (w/w), and/or around 40, 45, 50, 55, 60, 65, 70, 75, or 80% (w/w).
72. A composition according to embodiments 70 or 71, wherein said purity is determined based on content of Klason lignin or acid insoluble lignin, and optionally, wherein the corresponding percentage constituting impurities may be any one or more impurity as defined in embodiments 68 or 69.
73. A composition according to any one of the preceding embodiments, wherein said lignin originates from a lignocellulosic biomass having been subjected to a hydrothermal pretreatment followed by a hydrolysis of at least part of the cellulose and at least part of the hemicellulose present in said lignocellulosic biomass.
74. A composition according to any one of the preceding embodiments, wherein said lignin originates from a lignocellulosic biomass having been subject to a hydrothermal pretreatment followed by a hydrolysis of at least part of the cellulose and at least part of the hemicellulose present in said lignocellulosic biomass; and optionally followed by a fermentation, such as an alcohol fermentation.
75. A composition according to embodiment 73 or 75, wherein said hydrolysis is an acid catalyzed hydrolysis, an alkaline hydrolysis, an enzymatic hydrolysis or any combination thereof.
76. A composition according to any one of embodiments 73-75, wherein said lignin is obtained by pressing a fibrous fraction obtained after subjecting said lignocellulosic biomass to said hydrothermal pretreatment followed by said hydrolysis.
77. A composition according to embodiment 76, wherein said pressing of said fibrous fraction is preceded by rinsing and/or washing of said fibrous fraction.
78. A composition according to embodiment 76 or 77, wherein said lignin is obtained by mechanically comminuting said pressed fibrous fraction to a desired extent, such as to around or at least 20, 25, 30, 35 or 40% dm (w/w).
79. A composition according to any one of the preceding embodiments, wherein said lignin is obtained by a process for treatment of a lignocellulosic biomass, said process comprising:
  a) subjecting said lignocellulosic biomass to hydrothermal pretreatment resulting in a hydrothermally pretreated lignocellulosic biomass;
  b) subjecting at least part of said hydrothermally pretreated lignocellulosic biomass obtained in step (a) to a hydrolysis resulting in a liquid fraction comprising soluble carbohydrates, and a fiber fraction comprising a lignin component;
  c) optionally subjecting at least part of the liquid fraction obtained in step (b) to a fermentation in order to ferment at least part of said soluble carbohydrates to a fermentation product, such as ethanol, methane or butanol, thereby obtaining a fermentation broth;
  d) optionally isolating at least part of said fermentation product from the fermentation broth obtained in step (c) e.g. by distillation; and
  e) isolating at least part of the lignin from one or more of: the fibre fraction obtained in step (b); the fermentation broth obtained in step (c); or after isolation of at least a part of the fermentation product in step (d).
80. A composition according to embodiment 79, wherein said at least part of said lignin fraction is isolated from the fibre fraction obtained in step (b).
81. A composition according to embodiment 79 or 80, wherein said at least part of said lignin fraction is isolated from said fermentation broth obtained in step (c).
82. A composition according to any one of the embodiments 79-81, wherein said lignin is obtained in step (b), (c) and/or (e) by removing an associated liquid phase by using one or more separation device(s), such as a hydraulic press, a vacuum filtration unit, a belt filter, a rotary filter or a centrifuge decanter.
83. A composition according to any one of the embodiments 79 to 82, wherein said lignin obtained in step (b), (c) and/or (e) is dried to a residual water content at 110° C. of 0-10% (w/w), such as 0.5-7.5% (w/w), such as 1-5% (w/w), such as 2-4% (w/w), or 2-25% (w/w), such as 4-20% (w/w), for example 6-16% (w/w), such as 8-14% (w/w), e.g. 10-12% (w/w).
84. A composition according to any one of the embodiments 79 to 83, wherein said hydrothermal pretreatment of said lignocellulosic biomass is performed without addition of one or more acid(s) and/or base(s).
85. A composition according to any one of the embodiments 79 to 84, wherein said hydrothermal pretreatment of said lignocellulosic biomass (i) comprises or (ii) does not comprise addition of an acid and/or base, such as $H_2SO_4$, HCl, $NH_3$, $NH_4OH$, NaOH, KOH, $Ca(OH)_2$ or the like.
86. A composition according to any one of the embodiments 79 to 85, wherein said hydrothermal pretreatment of said lignocellulosic biomass is performed at a temperature of 150-260° C., such as 160-250° C., e.g. 170-240° C., such as 180-230° C., for example 190-220° C., such as 200-210° C.

87. A composition according to any of the embodiments 79 to 86, wherein said hydrothermal pretreatment of said lignocellulosic biomass is performed in a period of residence time of 2-120 min., such as 5-110 min., e.g. 10-100 min., for example 15-90 min., such as 20-80 min., such as 25-70 min., e.g. 30-60 min, such as 35-50 min, such as 40-45 min.

88. A composition according to any one of the embodiments 79 to 87, wherein said hydrothermal pretreatment of said lignocellulosic biomass is performed by subjecting said lignocellulosic biomass to a log severity, log(Ro) of 2.5 or more, such as a log(Ro) of 2.6 or more, e.g. a log(Ro) of 2.7 or more, such as a log(Ro) of 2.8 or more, for example a log(Ro) of 2.9 or more, such as a log(Ro) of 3.0 or more, such as a log(Ro) of 3.1 or more, for example a log(Ro) of 3.2 or more, e.g. a log(Ro) of 3.3 or more, such as a log(Ro) of 3.4 or more, such as a log(Ro) of 3.5 or more; such as a log(Ro) of 3.6 or more; for example such as a log(Ro) of 3.7 or more, e.g. a log(Ro) of 3.8 or more, for example a log(Ro) of 3.9 or more, for example a log(Ro) of 4.0 or more, such as a log(Ro) of 4.1 or more, or a log(Ro) of 4.2 or more; wherein the log severity is defined as: $\log(Ro) = (\text{residence time}) \times (\exp[\text{Temperature} - 100 / 14.75])$.

89. A composition according to any one of the embodiments 79 to 88, wherein said hydrothermal pretreatment of said lignocellulosic biomass results in a xylan number of: below 4, around 4, 4-5, around 5, 5-6, around 6, 6-7, around 7, 7-8, around 8, 8-9, around 9, 9-10, around 10, 10-11, around 11, 11-12, around 12, 12-13, around 13, 13-14, around 14, 14-15, around 15, 15-16, around 16, 16-17, around 17, or more than 17.

90. A composition according to any one of the embodiments 79 to 89, wherein said hydrolysis is (i) an acid catalyzed hydrolysis and/or (ii) an enzymatic hydrolysis, said enzymatic hydrolysis comprising pH adjustment before and/or during hydrolysis.

91. A composition according to any one of the embodiments 79 to 90, wherein said hydrolysis comprises the action of one or more cellulase(s).

92. A composition according to embodiment 91, wherein said one or more cellulases are selected from the group comprising exo-glucanases, endo-glucanases, hemi-cellulases and beta-glucosidases.

93. A composition according to any one of the any one of the embodiments 79 to 92, wherein said hydrolysis is performed for a period of time of 1-200 hours, such as 5-190 hours, such as 10-185 hours, e.g. 15-180 hours, for example 20-175 hours, such as 25-170 hours, such as 30-165 hours, e.g. 35-160 hours, for example 40-155 hours, such as 45-150 hours, such as 50-145 hours, e.g. 55-140 hours, for example 60-135 hours, such as 65-130 hours, such as 70-125 hours, e.g. 75-120 hours, for example 80-115 hours, such as 85-110 hours, such as 90-105 hours, e.g. 95-100 hours.

94. A composition according to any one of the any one of the embodiments 79 to 93, wherein said step (b) and step (c) are performed as a separate hydrolysis and fermentation step (SHF), and wherein said hydrolysis is performed at a temperature of 30-72° C., such as 32-70° C., e.g. 34-68° C., for example 36-66° C., such as 38-64° C., e.g. 40-62° C., 42-60° C., e.g. 44-58° C., for example 46-56° C., such as 48-54° C., e.g. 50-52° C.

95. A composition according to any one of the embodiments 79 to 94, wherein said hydrolysis is performed in a period of time of 70-125 hours, e.g. 75-120 hours, for example 80-115 hours, such as 85-110 hours, such as 90-105 hours, e.g. 95-100 hours.

96. A composition according to any one of the embodiments 79 to 95, wherein said step (b) and step (c) are performed as a simultaneous saccharification and fermentation step (SSF), and wherein said hydrolysis is performed at a temperature of 30-72° C., such as 32-70° C., e.g. 34-68° C., for example 36-66° C., such as 38-64° C., e.g. 40-62° C., 42-60° C., e.g. 44-58° C., for example 46-56° C., such as 48-54° C., e.g. 50-52° C.

97. A composition according to any one of the embodiments 79 to 96, wherein said hydrolysis is performed in a period of time of 1-12 hours, such as 2-11 hours, for example 3-10 hours, such as 4-9 hours, e.g. 5-8 hours, such as 6-7 hours.

98. A composition according to any one of the embodiments 79 to 97, wherein said step (b) and step (c) are performed as a simultaneous saccharification and fermentation step (SSF), and wherein said fermentation is performed at a temperature of 25-40° C., such as 26-39° C., e.g. 27-38° C., for example 28-37° C., e.g. 29-36° C., for example 30-35° C., such as 31-34° C. or 32-33° C.

99. A composition according to any one of the embodiments 79 to 98, wherein said fermentation is performed in a period of time of 100-200 hours, such as 105-190 hours, such as 110-185 hours, e.g. 115-180 hours, for example 120-175 hours, such as 125-170 hours, such as 130-165 hours, e.g. 135-160 hours, for example 140-155 hours, such as 145-150 hours.

100. A composition according to any one of the embodiments 79 to 99, wherein said process comprises "C5 bypass", i.e. comprising a solid/liquid separation step before step (b), wherein the liquid fraction is not subjected to said hydrolysis in step (b).

101. A composition according to any one of the embodiments 79 to 100, wherein said process comprises a two (or more) step treatment, and optionally, wherein a liquid fraction is collected after a first pretreatment step, e.g. by pressing.

102. A composition according to any one of the embodiments 79 to 101, wherein said process is conducted as "whole slurry" process, i.e. wherein the pretreated biomass is subjected directly in a subsequent hydrolysis step, such as an enzymatic hydrolysis and/or fermentation.

103. A composition according to any one of the preceding embodiments, wherein the lignin is obtained from soft lignocellulosic biomass, such as a biomass used or suitable for $2^{nd}$ generation bioethanol production, digestate or waste, and optionally from a process comprising essentially no addition of acid or base during pretreatment.

104. A composition according to any one of the preceding embodiments, wherein said composition is foaming at least 25, 20, 15, or 10% less under mixing when compared to a comparable composition comprising soda lignin, Kraft lignin, such as Indulin AT, organosolv lignin or pure lignin.

105. A composition according to any one of the preceding embodiments, wherein said composition is requiring significantly less anti-foaming agent, such as at least 10, 20, 30, 40, 50, 60, 70, 80, or 90% less anti-foaming agent, or no anti-foaming agent, when compared to a comparable composition comprising soda lignin, Kraft lignin, such as Indulin AT, organosolv lignin or pure lignin in order to provide comparable foaming characteristics during mixing.

106. A composition according to any one of the preceding embodiments, wherein said composition is requiring significantly less plasticity modifying agent, such as at least 10, 20, 30, 40, 50, 60, 70, 80, or 90% less anti-foam plasticity modifying agent, when compared to a comparable composition comprising soda lignin, Kraft lignin, such as Indulin AT, organosolv lignin or pure lignin in order to provide comparable characteristics such as one or more quality parameters, such as penetration, softening point, rheology, cohesion, adhesion and durability, e.g. as disclosed in SHB #6, Chapter 5, in particular Chapters 5.5.1-5.5.4.

107. A composition according to any one of the preceding embodiments, wherein said composition comprises significantly more non-bitumen derived carbon, such as at least 10, 20, 30, 40, 50% or more non-bitumen derived carbon when compared to a comparable composition comprising soda lignin, Kraft lignin, such as Indulin AT, organosolv lignin or pure lignin in order to provide comparable characteristics such as one or more quality parameters, such as penetration, softening point, rheology, cohesion, adhesion and durability, e.g. as disclosed in SHB #6, Chapter 5, in particular Chapters 5.5.1-5.5.4.

108. A composition according to any one of the preceding embodiments, wherein said composition shows one or more of: (i) a significant reduction in oxidation, e.g. under mixing and/or exposure of a surface to air and/or oxygen; (ii) a significant increase in UV resistance, and/or (iii) a significant increase longevity, wherein said significant reduction or increase is at least 10, 20, 30, 40 or 50%. when compared to a composition comprising soda lignin, Kraft lignin, such as Indulin AT, organosols lignin, or pure lignin instead.

109. Use of a composition according to any one of the preceding embodiments in one or more of: sealing work, road work, paving work, providing a surface layer, providing a sealing layer, providing a road and providing a pavement, providing a top layer of a road.

110. Use of a composition according to any one of embodiments 1-108 in applications relating to (i) agriculture, (ii) buildings and industrial paving, (iii) hydraulics and erosion control, (iv) industrial, (v) paving, (vi) railways, and (vii) recreation, such as ad (i) disinfectants, fence post coating, mulches, mulching paper, paved barn floors, barnyards, feed platforms, protecting tanks, vats, protection for concrete structures, tree paints (protective); ad (ii): water and moisture barriers (above and below ground), floor compositions, tiles, coverings, insulating fabrics, papers, step treads, building papers, caulking compounds, cement waterproofing compounds, glass wool compositions, insulating fabrics, felts, papers, joint filler compounds, laminated roofing shingles, liquid roof coatings, plastic cements, shingles, acoustical blocks, compositions, felts, bricks, damp-proofing coatings, compositions, insulating board, fabrics, felts, paper, masonry coatings, plasterboards, putty, soundproofing, stucco base, wallboard, air-drying paints, varnishes, artificial timber, ebonised timber, insulating paints, plumbing, pipes, treated awnings, canal linings, sealants; ad (iii): catchment areas, basins, dam groutings, dam linings, protection, dyke protection, ditch linings, drainage gutters, structures, embankment protection, groynes, jetties, levee protection, mattresses for levee and bank protection, membrane linings, waterproofing, reservoir linings, revetments, sand dune stabilisation, sewage lagoons, oxidation ponds, swimming pools, waste ponds, water barriers, backed felts, ad (iv): conduit insulation, lamination, insulating boards, paint compositions, papers, pipe wrapping, insulating felts, panel boards, underseal, battery boxes, carbons, electrical insulating compounds, papers, tapes, wire coatings, junction box compound, moulded conduits, black grease, buffing compounds, cable splicing compound, embalming, etching compositions, extenders, explosives, lap cement, plasticisers, preservatives, printing inks, well drilling fluid, armoured bituminised fabrics, burlap impregnation, mildew prevention, sawdust, cork, asphalt composition, acid-proof enamels, mastics, varnishes, acid-resistant coatings, air-drying paints, varnishes, anti-corrosive and anti-fouling paints, anti-oxidants and solvents, base for solvent compositions, baking and heat-resistant enamels, boat deck sealing compound, lacquers, japans, marine enamels, blasting fuses, briquette binders, burial vaults, casting moulds, clay articles, clay pigeons, expansion joints, flowerpots, foundry cores, friction tape, gaskets, mirror backing, rubber, moulded compositions, shoe fillers, soles; ad (v): airport runways, taxiways, aprons, asphalt blocks, brick fillers, bridge deck, surfacing, crack fillers, floors for buildings, warehouses, garages, highways, roads, streets, shoulders, kerbs, gutters, drainage ditches, parking lots, driveways, Portland cement concrete underseal, roof-deck parking, pavements, footpaths, soil stabilisation; ad (vi) ballast treatment, dust laying, paved ballast, sub-ballast, paved crossings, freight yards, station platforms; and ad (vii) dance pavilions, drive-in movies, gymnasiums, sport arenas, playgrounds, school yards, race tracks, running tracks, skating rinks, swimming and wading pools, tennis courts, handball courts, synthetic playing fields and running track surfaces.

111. A sealing layer comprising a composition according to any one of the preceding embodiments.

112. A sealing layer according to embodiment 111, said sealing layer being comprised in a roof, dam, pool, pond, lake, roof, bridge, tunnel, road, or the like.

113. A sealing layer according to embodiment 111 or 112, said sealing layer comprising 5-15, or 7-10% bitumen, optionally being provided by heating mastic asphalt to a temperature of 210° C. and being spreading in layers to form an impervious barrier of e.g. 20 mm.

114. An asphalt composition comprising a composition according to any one of embodiments 1 to 109.

115. An asphalt according to embodiment 114, said asphalt being mastic asphalt or rolled asphalt.

116. A road and/or pavement comprising a composition according to any one of embodiments 1-108, 114 or 115.

117. A road and/or pavement according to embodiment 116, comprising a surface layer and optionally one or more further layers.

118. A road and/or pavement according to embodiment 116 or 117, wherein said one or more further layer is a binder layer, a base layer, and/or a sub base layer.

119. A road and/or pavement according to any one of embodiments 116-118, wherein said surface layer comprises a composition according to any one of embodiments 1-108, 114 or 115.

120. A road and/or pavement according to any one of embodiments 116 to 119, wherein said one or more further layer comprises a composition according to any one of embodiments 1 to 107, 113 or 114.

121. Construction work comprising the provision and/or use of a composition according to any one of embodiments 1-107, 113 or 114, such as a use according to embodiments 109 or 110.
122. Construction work according to embodiment 121, said work being road work and/or sealing work.
123. A process for providing a composition according to any one of embodiments 1 to 108, 114 or 115, comprising the steps of mixing said bitumen, said one or more plasticity modifying agent(s), said lignin, and said optionally one or more further component(s).
124. A process according to embodiment 123, wherein said mixing comprises mixing at a temperature between 140 and 220, 160-200, or 170-180° C.
125. A process for treatment of a lignocellulosic biomass, said process comprising:
   a. subjecting said lignocellulosic biomass for hydrothermal pretreatment resulting in a hydrothermally pretreated lignocellulosic biomass;
   b. subjecting at least part of said hydrothermally pretreated lignocellulosic biomass obtained in step (a) to a hydrolysis resulting in a liquid fraction comprising soluble carbohydrates, and a fiber fraction comprising a lignin component;
   c. optionally subjecting at least part of the liquid fraction obtained in step (b) to a fermentation in order to ferment at least part of said soluble carbohydrates to a fermentation product, such as ethanol, methane or butanol, thereby obtaining a fermentation broth;
   d. optionally isolating at least part of said fermentation product from the fermentation broth obtained in step (c) e.g. by distillation;
   e. isolating at least part of the lignin from one or more of: the fiber fraction obtained in step (b); the fermentation broth obtained in step (c); or after isolation of at least a part of the fermentation product in step (d);
   f. converting at least part of the lignin component obtained in step (e) to a composition according to any one of embodiments 1-108, 114 or 115 by admixing said lignin component with bitumen and a plasticity modifying agent(s).
126. A process according to embodiment 125, further comprising one or more step(s) and/or feature(s) according to any one of the preceding embodiments, such as a mixing step according to embodiment 123 or 124.
127. A bitumen emulsion comprising a composition according to any one of embodiments 1-108, 114 or 115.
128. A maintenance, repair and/or re-cycling process comprising the use of a composition according to any one of embodiments 1-108, 114, 115, or 127 and/or a sealing layer, road or pavement according to any one of embodiments 111-113, or 116-120.

EXAMPLES

TABLE 1

Description of lignin utilised. Klason lignin, glucan, xylan, and ash contents were determined by NREL strong acid hydrolysis.

| Name of lignin | ISK name[*] | Description | Pretreatment process conditions[] | Enzyme hydrolysis conditions | Fermentation | Klason Lignin (% of TS) | Glucan (% of TS) | Xylan (% of TS) | Ash (% of TS) | LIEC[*] (mol/kg) |
|---|---|---|---|---|---|---|---|---|---|---|
| Kraft | — | Indulin AT: Type of kraft lignin from paper industry | — | — | — | 72.6% | 0.1% | 1.1% | 4.1% | 0.471 |
| F3 | 13-62-R6-3 F | Inbicon version 1, low enzyme dosage | Xylan number = 5 | Low (Version 1) | Yes | 61.1% | 14.8% | 1.2% | 12.1% | 0.071 |
| F4 | 13-62-R6-4 F | Inbicon version 1, high enzyme dosage | Xylan number = 5 | High (Version 1) | Yes | 71.2% | 3.5% | 2.2% | 13.2% | 0.093 |
| V2 | 14-56-R4-6 | Standard Inbicon lignin (version 2) | Xylan number = 12.3 | Low (Version 2) | Yes | 52.8% | 21.7% | 5.8% | 10.2% | 0.133 |
| V3 | 14-56-R4-11 | Unfermented Inbicon lignin (version 3) | Xylan number = 12.3 | Low (Version 2) | No | 45.0% | 25.3% | 7.7% | 8.9% | 0.130 |
| A | 15-10-K5-3 | Lignin from acid pretreatment | Xylan number = 7 (40 g$H_2SO_4$/kg TS) | Low (Version 2) | Yes | 58.0% | 14.8% | 3.7% | 12.5% | 0.044 |

[*] internal reference number.
[**] "Xylan number" - see Example 8
[***] "Lignin Ion Exchange Capacity" - see Example 9

TABLE 2

Analysis of lignin. Phenolic OH (phOH) and carboxylic acids (COOH) contents were quantified by non-aqueous titration. C, H, N, and O contents were quantified in a CHN-Analyzer (EuroVector EuroEA 3000). Remaining elemental contents were quantified using an X-ray fluorescence spectrometer (Rigaku Supermini 200).

| Name of lignin | phOH (mmol/g) | COOH (mmol/g) | Mg (%) | Al (%) | Si (%) | P (%) | S (%) | Cl (%) | K (%) | Ca (%) | Fe (%) | C (%) | H (%) | N (%) | O (%) |
|---|---|---|---|---|---|---|---|---|---|---|---|---|---|---|---|
| Kraft | 2.19 ± 0.01 | 1.58 ± 0.08 | 0.037 ± 0.002 | 0.014 ± 0.003 | 0.03 ± 0.005 | 0.001 ± 0.001 | 1.676 ± 0.014 | 0.013 ± 0.000 | 0.211 ± 0.003 | 0.023 ± 0.000 | 0.005 ± 0.000 | 61.7 ± 0.1 | 5.42 ± 0.21 | 0.72 ± 0.07 | 28.20 ± 2.35 |
| F3 | n.d. | n.d. | 0.016 | 0.054 | 5.97 | 0.082 | 0.16 | 0.016 | 0.28 | 0.47 | 0.063 | n.d. | n.d. | n.d. | n.d. |
| F4 | 1.46 ± 0.03 | 1.23 ± 0.00 | 0.032 ± 0.008 | 0.041 ± 0.002 | 5.64 ± 0.004 | 0.120 ± 0.002 | 0.196 ± 0.002 | 0.057 ± 0.002 | 0.273 ± 0.005 | 0.522 ± 0.009 | 0.059 ± 0.002 | 50.6 ± 0.3 | 4.98 ± 0.06 | 1.59 ± 0.04 | 35.56 ± 0.23 |
| V2 | 0.94 ± 0.09 | 1.23 ± 0.01 | 0.067 ± 0.006 | 0.076 ± 0.000 | 3.83 ± 0.061 | 0.095 ± 0.003 | 0.139 ± 0.003 | 0.064 ± 0.001 | 0.346 ± 0.002 | 1.266 ± 0.011 | 0.121 ± 0.000 | 45.8 ± 0.1 | 5.04 ± 0.04 | 1.17 ± 0.11 | 41.94 ± 1.57 |
| V3 | 0.89 ± 0.12 | 1.12 ± 0.15 | 0.071 ± 0.006 | 0.066 ± 0.002 | 3.29 ± 0.004 | 0.054 ± 0.003 | 0.122 ± 0.001 | 0.087 ± 0.002 | 0.413 ± 0.004 | 0.896 ± 0.024 | 0.103 ± 0.001 | 45.9 ± 0.2 | 5.20 ± 0.14 | 1.03 ± 0.25 | 42.74 ± 2.94 |
| A | 1.15 ± 0.04 | 1.38 ± 0.06 | 0.026 ± 0.008 | 0.073 ± 0.002 | 2.92 ± 0.011 | 0.070 ± 0.001 | 0.730 ± 0.000 | 0.015 ± 0.000 | 0.197 ± 0.001 | 1.576 ± 0.019 | 0.170 ± 0.002 | 50.9 ± 0.0 | 5.44 ± 0.00 | 1.42 ± 0.00 | 36.41 ± 0.47 |
| OS | 2.70 ± 0.04 | 0.99 ± 0.09 | 0.000 ± 0.000 | 0.000 ± 0.000 | 0.000 ± 0.000 | 0.002 ± 0.000 | 0.000 ± 0.000 | 0.001 ± 0.001 | 0.018 ± 0.002 | 0.018 ± 0.001 | 0.004 ± 0.001 | 66.2 ± 1.9 | 5.85 ± 0.22 | 0.01 ± 0.01 | 27.95 ± 2.1 | n.d. = not determined

Example 1—Lignin Production

Information about the different lignin products and their origin is presented in Table 1. Indulin AT is a commercially available product from the Kraft pulping process. Other lignin products were produced at the DONG Energy Inbicon pilot plant by first soaking wheat straw to 40% TS with either water (for F3, F4, V2, and V3), pH around 6, or $H_2SO_4$ in water, pH 1.5±0.1 (for A), and then performing hydrothermal pretreatment at suitable process conditions (in this case 150-200° C. for 15-30 minutes) to give the desired xylan number. Xylan numbers indicative of pretreatment severities are given in Table 1. In case of samples V2 and V3, the pretreatment was milder than for F3 and F4. For V2 and V3, a solid/liquid separation was performed after pretreatment ("C5—bypass"), wherein the solid fraction proceeded to enzymatic hydrolysis, in contrast to the liquid fraction that bypassed this step. For V2 and V3, the liquid fraction was recombined with the enzymatically hydrolized fraction prior to fermentation. Enzymatic hydrolysis was performed with Cellic CTec 3 (Novozymes, Denmark) at either low (50-150 g/kg glucan) or high (250-350 g/kg glucan) enzyme dosage. pH was adjusted to 5.0 with CaOH prior to enzymatic hydrolysis. Hydrolysis time was either 100-120 hours (Version 1) or 140-160 hours (Version 2). In some cases, enzymatic hydrolysis was followed by fermentation of glucose and/or xylose into ethanol. Then a solid/liquid separation was performed in a filter chamber press and the solid fraction (lignin) was dried at 50° C. to a dry matter content of at least 90. Lignin samples were then milled in an IKA MF 10 basic using a 0.5 mm sieve yielding an expected average particle size of around 0.5 mm. Lignin was characterised by NREL strong acid hydrolysis according to Sluiter et al. (2008) and non-aqueous titration according to Pobiner (1983). Immediately before mixing with bitumen, lignin samples were dried at 105° C. in a Mettler Toledo HR83-P until the mass loss was neglectable (according to standard factory settings) and the sample per definition was dry (100% TS). For analysis, unless indicated otherwise, samples were dried at 50° C. until stable (usually 24 h were sufficient).

Example 2—CHN and XRF Analysis

For CHN analysis, 1 mg of dried sample was weighed off in a tin thimble and analysed for C, H & N content in a Eurovector EA3000 CHN analyser with a thermal conductivity detector (TCD). The signal was quantified using a standard curve of acetanilide as a model compound. O contents were calculated by subtracting contents of C, H, N and ash from 100%. X-ray fluorescence spectrometry (XRF) was used for quantifying contents of Mg, Al, Si, P, S, Cl, K, Ca, and Fe. 4 grams of dry lignin sample was pelletized under 20 ton pressure in a Specac Atlas Manual 25T Hydraulic Press and analysed in a Rigaku Supermini 200. The results of the CHN analysis or $C_6H_{8.4}O_{35}$ (representing the average chemical for this type of samples) where used to balance the XRF output calculations. Results from analysis of lignin products are shown in Table 2.

Example 3—Preparation of Modified Bitumen

Bitumen (330/430) provided by Nynas A/S, Denmark, was heated to 180° C. using a glycerol bath. A desired amount of SBS (Polystyrene-block-polybutadiene-block-polystyrene, styrene 30% (w/w); CAS no: 9003-55-8; Sigma-Aldrich) was added to the bitumen and left for 15 min until the SBS was heated up. Homogenisation was performed by gradually increasing stirring rate (5000 rpm for 10 min, 10000 rpm for 20 min, 15000 rpm for 20 min) using an IKA T25 Ultra Turrax (S25N-18G Dispersing element). Homogenised bitumen was aliquoted into 20 mL glass scintillation vials (10 g in each) and lignin (10% (w/w) final concentration) was added and homogenised using an Ultra Turrax (10000 rpm, S25N-10G Dispersing element; 10000 rpm with dispersing element as close to the vial bottom as possible) for 10 min. No lignin was added to the negative control.

Example 4—Relative Foam Development

The degree of foaming was determined by measuring the height at which the foam reached for the given sample during preparation according to Example 3. Since height is proportional to volume in the cylindrical vials, this was used for calculating the increase in sample volume caused by foaming compared to a reference sample and relative to the original sample volume:

$$RFD = \frac{h_{sample} - h_{ref}}{h_{initial}} * 100, \quad (1)$$

where RFD is Relative Foam Development given in percent, $h_{sample}$ was the height of the sample including foam in the vial during homogenisation, $h_{ref}$ was the height during homogenisation of the reference sample, i.e. bitumen without lignin, and $h_{initial}$ was the height of the sample before addition of lignin and before homogenisation. Heights were recorded in mm by measuring on the glass vials immediately after homogenisation. As shown in FIG. 1, the height of the foam was visible on the transparent glass vials even after homogenisation. If the height was not even around the side of the vial, the height at the lowest point was measured.

Figure 2:
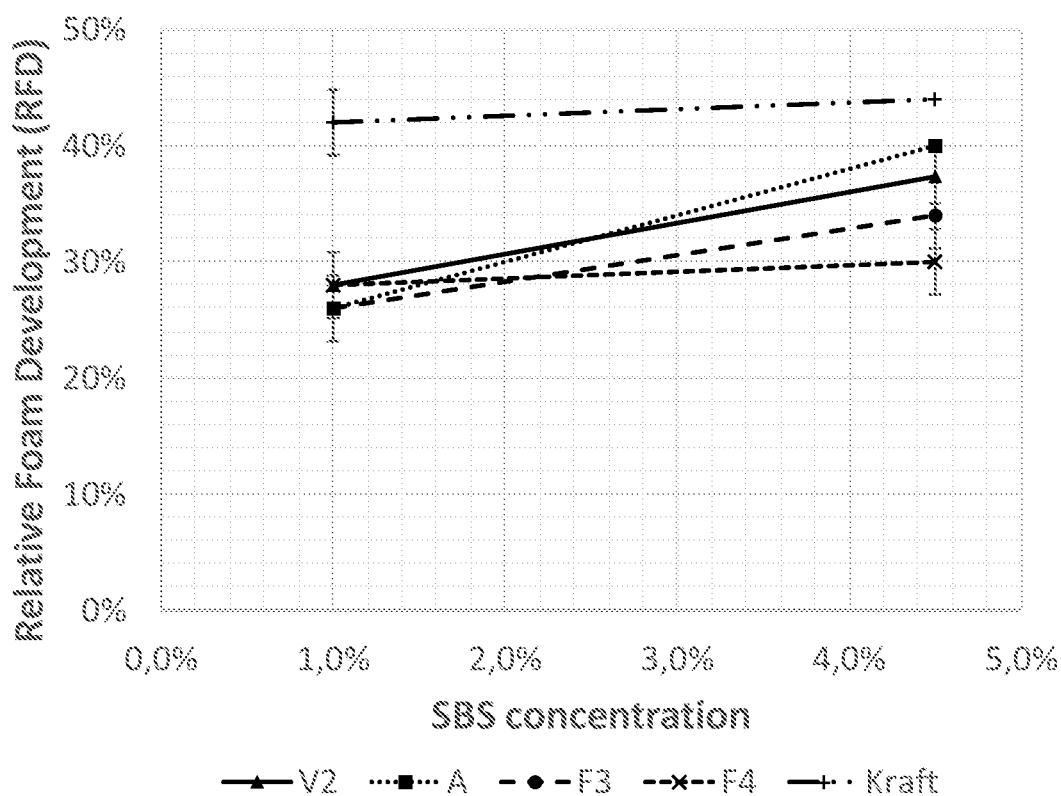
FIG. 2—Relative foam development vs. SBS concentration for bitumen comprising different lignin products.

Results are shown in Table 3 and FIG. 2. It was observed that foam development was higher for Kraft lignin compared to the other lignin types. This could be an issue in industrial application of this type of lignin in bitumen. Foam development at high SBS concentrations seemed to be governed by how lignin was produced, since RFD of F4 lignin (high severity, high enzyme dosage) was lower than RFD for V2 lignin (low severity, standard enzyme dosage). This suggests that RFD can be controlled by process conditions during lignin production. Results also indicated that addition of acid in biomass pretreatment could have a negative effects on RFD.

TABLE 3

Relative Foam Development of bitumen modified with various lignin products. Numbers are relative to the reference, i.e. without addition of lignin.

| | Relative Foam Development | |
|---|---|---|
| Sample name | 1% SBS | 4.5% SBS |
| Kraft | 44 ± 0% | 42 ± 3% |
| F3 | 34 ± 3% | 26 ± 3% |
| F4 | 30 ± 3% | 30 ± 3% |
| V2 | 37 ± 2% | 28 ± 0% |
| A | 40 ± 0% | 26 ± 3% |

Example 5—Softening Point

Directly after preparation, 3.5 g of hot bitumen or modified bitumen was poured into a round bottomless aluminium form (diameter of 28 mm) placed in a container with a 25% (w/w) glucose in glycerol on the bottom to prevent the sample from sticking to the container. The sample was allowed to cool for at least 30 min before it was transferred to a water bath (14 cm in diameter) containing 500 mL, 20° C. deionised water and a sample holder elevated 25 mm from the bottom of the container. A ball (1 g, 5 mm) was placed at the centre of the sample and left for 5 min. The heat plate was turned on to 140° C. giving a heating rate of 5.5±0.5° C./min up until 50° C. This heating rate steadily decreased to around 3.25±0.5° C./min at 70° C. The softening point was the temperature where the sample touched the bottom of the container.

It is seen that at low SBS concentration (1%), lignin in general had a positive effect, i.e. increase in softening point of bitumen (Table 4). Furthermore, it was also observed that at low SBS concentration, lignin with Klason lignin contents as low as 53% (V2) increased the softening point of bitumen more than much purer lignin as for example Kraft lignin with a Klason lignin content of 73%. At high SBS concentration (4.5%), the general tendency was that addition of lignin tends to slightly lower the softening point.

TABLE 4

Test results of bitumen modified with various lignin products.

| | Softening point | |
|---|---|---|
| Sample name | 1% SBS | 4.5% SBS |
| No lignin | 38.9 ± 0.5° C. | 72.1 ± 0.7° C. |
| Kraft | 40.1 ± 0.2° C. | 69.4 ± 0.3° C. |
| F3 | 41.5 ± 1.0° C. | 70.7 ± 1.7° C. |
| F4 | 40.7 ± 1.0° C. | 70.1 ± 1.5° C. |
| V2 | 41.8 ± 0.8° C. | 69.4 ± 0.1° C. |
| A | 38.9 ± 0.6° C. | 70.4 ± 1.7° C. |

Example 6—Penetration Test

Directly after preparation, as described in Example 3, hot bitumen or modified bitumen was poured into a round aluminium form (diameter of 28 mm). Samples were left to cool at room temperature for at least 1 hour. A needle (1.4 mm in diameter, 0.2 mm at the tip) with a load yielding a total weight of 100 g was placed above the sample so that the tip barely touched it. The needle was released and the depth at which the needle penetrated the sample in 5 seconds was measured by measuring the distance at which the needle and load had dropped. Tests were done at room temperature (24±1° C.).

Results from the penetration test are presented in Table 5. As seen, none of the lignin products resulted in worse performance in the penetration test than the control. Actually, most lignin-comprising SBS/bitumen compositions seem to result in a slight reduction of penetration.

TABLE 5

Test results of bitumen modified with various lignin products.

| | Penetration test | |
|---|---|---|
| Sample name | 1% SBS | 4.5% SBS |
| No lignin | 5.8 ± 0.4 mm | 5.0 ± 0.4 mm |
| Kraft | 5.5 ± 0.7 mm | 5.0 ± 0.0 mm |
| F3 | 5.0 ± 0.7 mm | 4.3 ± 0.4 mm |
| F4 | 5.0 ± 0.7 mm | 4.8 ± 0.4 mm |
| V2 | 5.5 ± 0.7 mm | 5.0 ± 0.0 mm |
| A | 5.3 ± 0.4 mm | 4.3 ± 0.4 mm |

Example 7—Lignin Pre- and Post-Fermentation

V3 lignin was produced under similar process conditions as V2, but without fermentation after enzymatic hydrolysis. This resulted in a less pure lignin, i.e. lower Klason lignin content, and higher carbohydrate content presumably due to the presence of unfermented monosaccharides. After preparation according to Example 3 with 4.5% SBS and 10% lignin, modified bitumens were tested according to Example 5, respectively. Samples comprising V3 lignin showed a slightly lower softening point compared to V2-comprising samples (Table 6). Without wanting to be bound by any theory, one might speculate that this was e.g. due to the unfermented monosaccharides in V3, so that if these were removed from the lignin, either by washing or by fermentation into ethanol or other products, the lignin might behave similarly to V2 in bitumen samples.

TABLE 6

Comparison of SBS-modified bitumen modified comprising V2 and V3 lignin products.

|  | Softening point |
|---|---|
| No lignin | 72.1 ± 0.7° C. |
| V2 | 69.4 ± 0.1° C. |
| V3 | 67.7 ± 1.0° C. |

Example 8—Determination of Xylan Numbers

Pretreated biomass is subject to solid/liquid separation to provide a solid fraction at about 30% total solids and a liquid fraction. This solid fraction is then partially washed by mixing with 70° C. water in the ratio of total solids (DM) to water of 1:3 weight:weight (w:w). The solid fraction washed in this manner is then pressed to about 30% total solids. Xylan content of the solid fraction washed in this manner is determined using the method of A. Sluiter, et al., "Determination of structural carbohydrates and lignin in biomass," US National Renewable Energy Laboratory (NREL) Laboratory Analytical Procedure (LAP) with issue date Apr. 25, 2008, as described in Technical Report NREL/TP-510-42618, revised April 2008, which is expressly incorporated by reference herein in entirety. An HPLC column and elution system is used in which galactose and mannose co-elute with xylose. Examples of such systems include a REZEX™ Monossacharide H+ column from Phenomenex and an AMI-NEX HPX 87C™ column from Biorad. This measurement of xylan content as described will include some contribution of soluble material from residual liquid fraction that is not washed out of solid fraction under these conditions. Accordingly, "xylan number" provides a "weighted combination" measurement of residual xylan content within insoluble solids and of soluble xylose and xylo-oligomer content within the "liquid fraction." Without wanting to be bound by any theory, it is believed that there is an indirect correlation between xylan number and pretreatment severity, wherein high xylan numbers indicate low pretreatment severity, and vice versa.

Example 9—Determination of Lignin Ion Exchange Capacity (LIEC)

10 g of lignin (Kraft, F3, F4, V2, V3, A) (dry, i.e. dry matter above 95% (w/w)) is mixed with 40 g of a 23 (w/w) % KCl solution. The solution is homogenized with a Ultra Turrax for 30 s at ~10,000 rpm. It is then shaken for more than one hour at room temperature. The mixture is filtered and the filter cake is washed with 4×100 ml water. The filter cake is dried at 50° C. until stable (e.g. 24 h), and the content of potassium and chloride is measured by XRF according to Example 2

Results:

Before KCl treatment, all samples had similar K levels of 0.2-0.4%. However, after KCl treatment, Kraft lignin had a much higher K content (1.84%), while the 2G lignin samples had significantly lower K content (0.136-0.145%).

This clearly demonstrates the enhanced ability of Kraft lignin to bind K, relative to e.g Inbicon 2G lignin, caused by an increased number of hydrophilic, polar functional groups in Kraft lignin. The number of these groups can be estimated by calculating the so-called Lignin Ion Exchange Capacity (LIEC), here defined as the number of moles of potassium bound to lignin per kilo sample (unit: mol K/kg sample). This parameter has been calculated and is also given in the Table 7 below:

TABLE 7

LIEC values of lignin samples Kraft, F3, F4, V2, V3, and A

| Short name | K1 % | Cl1 % | K2 % | Cl2 % | LIEC mol/kg |
|---|---|---|---|---|---|
| Kraft | 0.227 | 0.014 | 1.842 | 0.0213 | 0.471 |
| F3 | 0.323 | 0.071 | 0.279 | 0.0163 | 0.071 |
| F4 | 0.273 | 0.057 | 0.366 | 0.021 | 0.093 |
| V2 | 0.339 | 0.063 | 0.520 | 0.0142 | 0.133 |
| V3 | 0.386 | 0.082 | 0.509 | 0.164 | 0.130 |
| A | 0.197 | 0.015 | 0.173 | 0.0071 | 0.044 |

REFERENCES

Pobiner, H. (1983). Improved inflection points in the non-aqueous potentiometric titration of acid functionalities in lignin chemicals by using internal standardization and ion exchange. Analytica Chimica Acta, 155, 57-65.

Sluiter A, Hames B, Ruiz R, Scarlata C, Sluiter J, Templeton D, Crocker D. (2008). Determination of structural carbohydrates and lignin in biomass. NREL Technical Report 510:42618.

The invention claimed is:

1. A composition comprising bitumen, one or more plasticity modifying agent(s), lignin, and optionally one or more further component(s); wherein said lignin has a Lignin Ion Exchange Capacity (LIEC) of 0.4 mol/kg dry matter (DM) or less.

2. A composition comprising bitumen, one or more plasticity modifying agent(s), lignin, and optionally one or more further component(s); wherein said lignin is obtained by a process for treatment of a lignocellulosic biomass, said process comprising:
   a) subjecting lignocellulosic biomass to hydrothermal pretreatment resulting in a hydrothermally pretreated lignocellulosic biomass;
   b) following step (a), subjecting at least part of said hydrothermally pretreated lignocellulosic biomass obtained in step (a) to a hydrolysis resulting in a liquid fraction comprising soluble carbohydrates, and a fiber fraction comprising a lignin component, wherein said hydrolysis is an acid catalyzed hydrolysis and/or enzymatic hydrolysis;
   c) optionally, following step (b), subjecting at least part of the liquid fraction obtained in step (b) to a fermentation in order to ferment at least part of said soluble carbohydrates to a fermentation product, thereby obtaining a fermentation broth,
   wherein said lignin has a Lignin Ion Exchange Capacity (LIEC) of 0.4 mol/kg dry matter (DM) or less.

3. The composition according to claim 2, wherein at least part of said lignin fraction is isolated from the fiber fraction obtained in step (b).

4. The composition according to claim 2, wherein at least part of said lignin fraction is isolated from said fermentation broth obtained in step (c).

5. The composition according to claim 2, wherein said hydrothermal pretreatment of said lignocellulosic biomass is performed at a temperature of 150-260° C.

6. The composition according to claim 2, wherein said hydrothermal pretreatment of said lignocellulosic biomass is performed in a period of residence time of 2-120 minutes.

7. The composition according to claim 2, wherein said hydrothermal pretreatment of said lignocellulosic biomass results in a xylan number of 5% or more.

8. The composition according to claim 2, wherein said hydrolysis comprises the action of one or more cellulase(s) selected from the group consisting of exo-glucanases, endo-glucanases, hemi-cellulases, and beta-glucosidases.

9. The composition according to claim 2, wherein said hydrolysis is performed for a period of time of 1-200 hours.

10. The composition according to claim 2, wherein said step (b) and step (c) are performed as a separate hydrolysis and fermentation step (SHF), and wherein said hydrolysis is performed at a temperature of 30-72° C.

11. The composition according to claim 2, wherein said step (b) and step (c) are performed as a simultaneous saccharification and fermentation step (SSF), and wherein said fermentation is performed at a temperature of 25-40° C. and wherein said hydrolysis is performed at a temperature of 30-72° C.

12. The composition according to claim 2, wherein said hydrolysis is performed in a period of time of 1-12 hours.

13. The composition according to claim 2, wherein said fermentation is performed in a period of time of 100-200 hours.

14. The composition according to claim 2, wherein said process comprises C5 bypass wherein the C5 bypass comprises a solid/liquid separation step before step (b), wherein the liquid fraction is not subjected to said hydrolysis in step (b).

15. The composition according to claim 2, wherein said process is conducted as whole slurry process, wherein the pretreated biomass is subjected directly in a subsequent hydrolysis step and/or fermentation.

16. The composition according to claim 2, wherein the lignin is obtained from soft lignocellulosic biomass.

17. The composition according to claim 16, wherein said process does not comprise addition of acid or base during pretreatment.

18. The composition according to claim 16, wherein the soft lignocellulosic biomass comprises a biomass used or suitable for $2^{nd}$ generation bioethanol production, digestate, or waste.

19. The composition according to claim 2, wherein said lignin has a phenolic OH (phOH) content of 2 mmol/g or less.

20. The composition according to claim 2, wherein said lignin has a sulphur (S) content of 0.4% (w/w) or less.

21. The composition according to claim 2, wherein the bitumen is straight run bitumen, hard bitumen, oxidised bitumen, cut-back bitumen or fluxed bitumen.

22. The composition according to claim 2, said further component(s) comprising one or more aggregate(s), one or more filler(s), and/or one or more active component(s).

23. The composition according to claim 22, wherein said one or more active component is selected from the group consisting of dispersing agent(s), surfactant(s), hydrotropic agent(s), emulsifier(s), preserving agent(s), anti-foaming agent (s), viscosity modifier(s), reactive polymer(s) and any combination thereof.

24. The composition according to claim 22, wherein said one or more aggregate(s) and/or filler(s) comprise a natural aggregate, a manufactured aggregate, a recycled aggregate, or combination of any thereof.

25. The composition according to claim 2, wherein said one or more plasticity modifying agent is one or more plastomer, one or more thermoplastic elastomer, one or more rubber, one or more viscosity modifier, one or more reactive polymer, or any combination thereof.

26. The composition according to claim 25, wherein said one or more plastomer is selected from the group consisting of: EVA, EMA, EBA, APP, PE, PP, PVC, and PS, and any combination thereof.

27. The composition according to claim 25, wherein said one or more thermoplastic elastomer is one or more of butadiene elastomer (SBE), linear or radial styrene-butadiene-styrene elastomer (SBS), styrene-butadiene rubber (SBR), styrene-isoprene-styrene elastomer (SIS), styrene-ethylene-butadiene-styrene elastomer (SEBS), ethylene-propylene-diene terpolymer (EPDM), isobutene-isoprene random copolymer (MR), polyisobutene (PIB), polybutadiene (PBD), polyisoprene (PI) and any combination thereof.

28. The composition according to claim 25, wherein said one or more rubber is a natural rubber.

29. The composition according to claim 28, wherein said natural rubber is latex.

30. The composition according to claim 25, wherein said one or more rubber is a synthetic rubber.

31. The composition according to claim 30, wherein said synthetic rubber is recycled tire rubber or recycled crumb rubber.

32. The composition according to claim 25, wherein said one or more viscosity modifier is one or more flux oil, Fischer-Tropsch waxes, or any combination thereof.

33. The composition according to claim 32, wherein said one or more flux oil is aromatics, napthenics, and/or parrafinics.

34. The composition according to claim 25, wherein said one or more reactive polymer is one or more random terpolymer of ethylene, acrylic ester and glycidyl methacrylate; maleic anhydride-grafted styrene-butadiene-styrene copolymer; or any combination thereof.

35. The composition of claim 2, wherein the fermentation product is ethanol, butane, or methanol.

36. A sealing layer comprising a composition according to claim 1.

37. An asphalt composition comprising a composition according to claim 1.

38. The asphalt composition according to claim 37, said asphalt composition being mastic asphalt or rolled asphalt.

* * * * *